(12) United States Patent
Burns

(10) Patent No.: US 6,611,512 B1
(45) Date of Patent: *Aug. 26, 2003

(54) APPARATUS AND METHOD FOR SCHEDULING CORRELATION OPERATIONS OF A DS-CDMA SHARED CORRELATOR

(75) Inventor: Geoffrey F. Burns, Ridgefield, CT (US)

(73) Assignee: Agere Systems Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/262,280

(22) Filed: Mar. 4, 1999

Related U.S. Application Data

(63) Continuation-in-part of application No. 09/172,378, filed on Oct. 14, 1998.

(51) Int. Cl.$^7$ ................................................. H04J 13/00
(52) U.S. Cl. ......................... 370/342; 370/441; 375/150
(58) Field of Search ................................. 370/209, 320, 370/328, 335, 342, 441, 468, 479; 375/316, 343, 152, 349, 150; 712/2, 7, 8, 32, 205–207, 237, 238

(56) References Cited

U.S. PATENT DOCUMENTS 5,249,231 A * 9/1993 Covey et al. .................. 380/25
5,870,378 A * 2/1999 Huang et al. ................ 370/209
5,881,056 A * 3/1999 Huang et al. ................ 370/335
6,119,222 A * 9/2000 Shiell et al. ................. 712/238
6,470,000 B1 * 10/2002 Burns et al. ................. 370/342

* cited by examiner

Primary Examiner—Duc Nguyen
(74) Attorney, Agent, or Firm—Steve Mendelsohn; Ian M. Hughes

(57) ABSTRACT

An apparatus and method of a shared correlator system for a code division, multiple access (CDMA) receiver employs scheduling of correlation operations with identification tags (ID-tags). The scheduling allows for shared vector generation and correlation operations between processing units by pipeline processing. The shared correlator schedules correlation operations requested by processing units, generates matched-filter PN vectors associated with the identification tags for the correlation operations, and provides correlation results for the correlation operations. Scheduling may be implemented with a control processor, scheduler and memory. The control processor determines the matched-filter PN vector information for a requested operation using the current state of a reference PN code sequence, and this information is stored as the ID-tag. The control processor stores the ID-tag at an address in memory associated with a slot of a periodic symbol schedule. A counter of the scheduler steps through each memory address to provide an ID-tag for each slot. The ID-tag allows the matched-filter PN vector information for a requested correlation operation to be provided to the vector generator and vector correlator to generate the matched-filter PN vector for the slot.

20 Claims, 12 Drawing Sheets

APPARATUS AND METHOD FOR SCHEDULING CORRELATION OPERATIONS OF A DS-CDMA SHARED CORRELATOR

CROSS-REFERENCE TO RELATED APPLICATIONS

This is a continuation-in-part of copending application Ser. No. 09/172,378, filed on Oct. 14, 1998, the teachings of which are incorporated herein by reference.

BACKGROUND OF THE INVENTION

1. Field of the Invention

The present invention relates to code division, multiple access (CDMA) communication systems, and, more particularly, to scheduling correlation operations of a shared, vector correlator of a CDMA receiver.

2. Description of the Related Art

Several code division, multiple-access (CDMA) standards have been proposed, and one such standard is the IS-95 standard adopted for cellular telephony. As with many CDMA systems, IS-95 employs both a pilot channel for a base station and data, or message, channels for communication by the base station and users. The base station and users communicating with the base station each employ assigned, pseudo-random sequences, also known as pseudo-noise (PN) code sequences, for spread-spectrum "spreading" of the channels. The assigned PN code sequence is a sequence of a predetermined number of bits. For each user transceiver, the PN code sequence is used to spread data transmitted by the transceiver and to despread data received by the transceiver. The PN code sequence is used for both In-phase (I) and Quadrature-phase (Q) channels, is a sequence with a known number of bits, and is transmitted at a predetermined clock rate.

Each bit-period, or phase transition, of the PN code sequence is defined as a chip, which is a fraction of the bit-period of each data symbol. Consequently, the PN code sequence is combined with the data sequence so as to "spread" the frequency spectrum of the data over a larger frequency spectrum. In IS-95, for example, 64 chips represent one data symbol. The pilot channel and each user are also assigned a different Walsh code that is combined with the spread channel to make each spread channel signal orthogonal. The pilot channel is assigned the all zeros Walsh code. An exclusive-OR combination of the zero Walsh code with the PN code sequence of the I and Q channels, respectively, leaves the PN code sequence of the pilot channel unaltered. No data symbols are spread or transmitted on the pilot channel.

To determine when a signal is transmitted, and to synchronize reception and processing of a transmitted signal, IS-95 specifies a correlation finger correlating a known portion of the PN code sequence, for example, an IS-95 pilot epoch, with the sampled received signal. The pilot epoch is the time interval over which a pseudo-noise (PN) code sequence of a pilot signal repeats. The known portion of the IS-95 pilot epoch is the first 64 chips output from I-phase and Q-phase PN sequence generators subsequent to a roll-over state. The beginning of the pilot epoch is the rollover state, and is the state at which the I-phase sequence and Q-phase sequence in respective PN generators have the same logic value in all register stages of the PN code generator. The IS-95 system may insert an extra value in the PN code sequence so that the PN code sequence is a multiple of 2. Additional logic may be required to insert the extra value into each sequence following 14 consecutive 1's or 0's. The extra value renders a $2^{15}$ chip period PN sequence. Consequently, for systems such as IS-95, at the beginning of the pilot epoch the value in the first register stage is forced to a logic "1" prior to the next state transition from the all zero register state.

Demodulation of a spread signal received from a communication channel requires synchronization of a locally generated version of the PN code sequence with the embedded PN code sequence in the spread signal. Then, the synchronized, locally generated PN code sequence is correlated against the received signal and the cross-correlation extracted between the two. For a user channel, the signal of the extracted cross-correlation is the despread data signal. For IS-95 systems, demodulation begins by first synchronizing a local code sequence pair, one for the I-phase spread data channel (I-channel) and one for the Q-phase spread data channel (Q-channel), with an identical pair of PN code sequences embedded in the signal received from the communication channel.

Communication systems are often subject to transmission path distortion in which portions, or paths, of a transmitted signal arrive at a receiver, each portion having different time offsets and/or carrier phase rotation. Consequently, the transmitted signal appears as a multiplicity of received signals, each having variations in parameters relative to the transmitted signal, such as different delays, gains and phases. Relative motion between a transmitter and receiver further contribute to variations in the received signal. The receiver desirably reconstructs the transmitted signal from the multiplicity of received signals.

A type of receiver particularly well suited for reception of multipath, spread-spectrum signals is a RAKE receiver. The RAKE receiver comprises several correlation fingers to cross correlate each multipath signal with an offset version of the reference PN code sequence. The RAKE receiver optimally combines the multipath signals received from the various paths to provide an extracted cross-correlated signal with high signal-to-noise ratio (SNR). The RAKE receiver may be analogized to a matched-filter where the path gains of each correlation finger, like the taps of a matched-filter, may be estimated to accurately detect a received multipath, spread-spectrum signal. Since a transmitted signal is subject to many types of distortion as it passes through a communication channel to a receiver (i.e., multipath effects, Rayleigh fading, and Doppler shifts), the receiver must estimate the path gains utilizing the transmitted signal as distorted at the receiver. Thus, the detected received signal will only be as robust as the path gain estimation of each correlation finger in the RAKE receiver.

U.S. Pat. Nos. 5,448,600; 5,442,661; 5,442,627; 5,361,276; 5,327,455; 5,305,349; and 5,237,586, the disclosures of which are hereby incorporated by reference, each describe a RAKE receiver. In RAKE receivers, for each fractional chip increment, a correlation with the pilot epoch is performed, which may be represented using the complex conjugate of the expected sequence, $x_r(n)+x_i(n)$, as $$cc_r(n) = \sum_{m=0}^{63} x_r(m) \cdot y_r(m+n\tau) + \sum_{m=0}^{63} x_i(m) \cdot y_i(m+n\tau) \quad (1)$$

and

-continued $$cc_i(n) = \sum_{m=0}^{63} x_r(m) \cdot y_i(m+n\tau) - \sum_{m=0}^{63} x_i(m) \cdot y_r(m+n\tau) \quad (2)$$

where:
- n and m are integer counters
- $cc_r(n)$ are the real components of the cross-correlation
- $cc_i(n)$ are the imaginary components of the cross-correlation
- y is the sampled received signals
- x is the reference sequence (matched-filter PN vector sequence)
- τ is a fractional chip Thus, as can be seen from equations (1) and (2), four real correlations are performed in the process of performing one complex correlation.

The locally generated PN code sequence (the "reference PN code sequence" or "reference PN code sequence") provides the basic elements for generating reference PN sequences, or matched-filter PN vectors, for matched-filter correlation against the received signal. Each PN code sequence is deterministic with a period of $2^{N-1}$ chips (PN values), N an integer greater than 1. The PN code sequence is identical between base-stations in an IS-95 system, and maybe augmented by one chip to provide a sequence with a period of $2^{15}$ chips. This PN code sequence is also known as the "short" code in IS-95 systems. The PN code sequence of each base-station is used for forward channel spreading, and in IS-95-based CDMA communication systems the code-phase offset of the PN code sequence is unique to a base-station. Therefore, to differentiate between base-stations, each base-station is assigned a unique time offset in the PN code sequence.

A PN code generator of an exemplary IS-95 system provides the code sequence for each of the I and Q channels recursively using a $15^{th}$ order polynomial, resulting in a period of, for example, $2^{15}-1$ chips. The hardware realization for such a PN code generator is a shift register having 15 stages and with selected shift register outputs combined in modulo-2 addition to form the next PN code sequence value that is also the recursive input value to the beginning of the shift register.

Referring to FIG. 1, there is shown a generalized pseudo-noise (PN) generator 100 as may be used to generate a PN code sequence and a serial correlator 150 that may be employed to correlate a portion of the PN code sequence with a received signal. Such serial correlator may also be employed in a matched-filter vector correlator. The hardware implementation of the PN generator 100 shown in FIG. 1 is of a Fibonacci type, but other types of generators, such as a Galois type, may be used. The generalized PN generator 100 as shown in FIG. 1 includes shift register 102, gain amplifiers 104, and modulo-2 adder 110. PN generator 100 may further include registers 111 and 112 and optional delay 113. In FIG. 1, gain amplifiers 104 have gain values $g_{[n:0]}$, that are the generating polynomial coefficients of the generating polynomial G. Also, $S=S_{[n:0]}$ is the state of shift register 102.

As is known in the art, PN generator 100 generates a code in the following manner. First, shift register 102 is loaded with a polynomial "seed" value. The seed value is typically one state of the shift register that forms a portion of the resulting PN sequence. Then, for each clock cycle, the value of the shift register is combined via gain amplifiers 104 in a modulo-2 adder 110. Each gain amplifier 104 adjusts the value in each corresponding stage of the shift register 102 according to generating polynomial coefficients. This is a cyclic process: the value in modulo-2 adder 110 is then applied to the first element of the shift register 102 and the last element is discarded. Each state of the shift register 102 may be loaded into storage registers for use with, for example, the I and Q channels, respectively.

The IS-95 system may augment the PN code sequence by inserting an extra value in the PN code sequence so that the PN code sequence is a multiple of 2. Additional logic (not shown in FIG. 1) inserts the extra value into each sequence following 14 consecutive 1's or 0's. The extra value renders a $2^{15}$ chip period PN sequence. Also, as is known in the art, a periodic bit sequence with a first code-phase may be combined with another sequence to form the same periodic bit sequence with a second code-phase. This process is known as masking. Consequently, a delayed, or offset, version of the sequence may be generated by modulo-2 addition of appropriate state bits of the shift register 102 with a selected mask. Additional logic for correcting the masked sequences may also be required if the PN code sequence is augmented.

Returning to FIG. 1, serial correlator 150 includes delays 151–155, multipliers 161–165, accumulators 171–175 and comparator 180. The delays 151–155 each receive the locally generated PN code sequence from the PN generator 100 and each provide a corresponding PN sequence with code-phase offset of, for example, $jz^{-1}$ chips, j an integer and $1 \leq j \leq 5$. The delay width $z^{-1}$ may be dependent on the type of process using the results of vector correlator 150. For example, $z^{-1}$ may be a quarter-chip width for code tracking, but may be one-chip width for searching. Multipliers 161–165 each multiply the received (sampled) signal x[n] with a corresponding one of the delayed PN code sequences to "despread" the signal. Accumulators 171–175 each accumulate the result from corresponding ones of multipliers 161–165 for a predetermined period, and comparator 180 compares the results to a predetermined threshold value. Each delay, multiply and accumulate chain may be considered a correlation finger. If the threshold value is exceeded by the result of the correlation finger, then the code-phase of the delayed PN code sequence matches the code-phase of the embedded code sequence in the signal of the correlation finger. The result of more than one correlation finger may exceed the threshold value of the comparator 180 if multi-path signal components are present.

For a receiver in a CDMA system using a vector correlator, as would be apparent to one skilled in the art, many matched-filter PN vectors must be generated in a receiver. Each of the search, tracking and demodulation functions is typically performed by a processing unit, each of which employs one or more vector correlator circuits, such as the vector correlator 150 of FIG. 1. For example, in a receiver's acquisition or search mode the receiver determines whether the pilot signal is present. In acquisition or search mode, the correlation finger must search through all fractional chip offsets of the pilot epoch in order to locate the pilot signal. As described previously, each complex correlation actually requires four real correlations. Correlations of correlation fingers in a RAKE receiver are often performed against multiple, fractional-chip offsets simultaneously, such as during initial search or handoff between base-stations. If a receiver tracks several base stations, as may be required for handoff, then the acquisition mode process must occur for the pilot of each base station.

Further, even when synchronization is achieved when the pilot signal is present, a receiver's tracking mode must track several correlation fingers, and in the demodulation mode must demodulate a spread user channel. Further, data detection mode detects a signature sequence intended for the particular receiver. The signature sequence, in IS-95, may be a "long" PN code sequence for security (i.e., the sequence of the "long" PN code is relatively longer than the sequence of the "short" PN code). In the data detection mode, there are several sub-modes. The sub modes include a paging data mode, a synchronization data mode, and a traffic mode, all of which require correlation operations.

RAKE receivers require replication of hardware for each correlation finger performing simultaneous correlation operations, resulting in redundant hardware. Simultaneous correlation operations may be achieved using multiple parallel correlators and vector generators. Prior art methods for generating multiple, matched-filter PN vectors include either generating multiple, parallel PN code sequences, each with a different offset, or applying a set of parallel masks to a single PN code sequence, each applied mask generating a PN sequence having a different offset. However, where a large degree of flexibility is required for scheduling correlation operations, and many different matched-filter PN vectors are required for a single symbol period, the hardware requirements of these methods are impractical.

Serial correlators of the prior art assemble both an offset local PN code and a receive data sequence that are then provided in parallel to the correlator hardware. The multiplexing rate of a serial correlator is limited by its total latency from the initial multiplication, bit-wise addition and accumulation functions of the correlator. Interdependence of each execution stage in the serial correlator, as well as the chip rate of the spreading sequence, limits this multiplexing rate.

SUMMARY OF THE INVENTION

The present invention relates to scheduling at least one correlation finger request of a shared vector correlator. Parameters defining an ID-tag for at least one matched-filter PN vector are determined from finger information of a correlation request, and a slot of a periodic symbol cycle corresponding to a time to generate the matched-filter PN vector is selected based on the finger information of the correlation request. An ID-tag is associated with the slot, and the ID-tag of each slot is provided in accordance with the periodic symbol cycle.

An embodiment of the present invention stores the ID-tag associated with the slot in an address of a memory; and sequentially providing each value of a counter. Each value of the counter corresponds to an address of the memory, and the memory provides the ID-tag stored in the corresponding address of the value of the counter.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, a scheduler of a shared correlator for a code division, multiple access (CDMA) receiver schedules pipeline processing with information tags to share vector generation and correlation operations between processing units. A signal input to the CDMA receiver is provided as, for example, In-phase channel (I) and quadrature-phase channel (Q) sample sequences I and Q. Sample vectors $I_{REC}$ and $Q_{REC}$ are formed from sequences I and Q applied to the shared correlator of the CDMA receiver. Processing units request correlation operations by the shared correlator in which matched-filter pseudo-noise (PN) vectors are correlated with the I and Q sample vectors $I_{REC}$ and $Q_{REC}$. The shared correlator schedules correlation operations requested by processing units, generates matched-filter, PN vectors with associated identification tags for the correlation operations, and provides correlation results for the correlation operations. Although the exemplary embodiments described below reference $I_{REC}$ and $Q_{REC}$ sample vectors, the present invention is not so limited, and may be used for a single channel or multiple channels.

Figure 2:
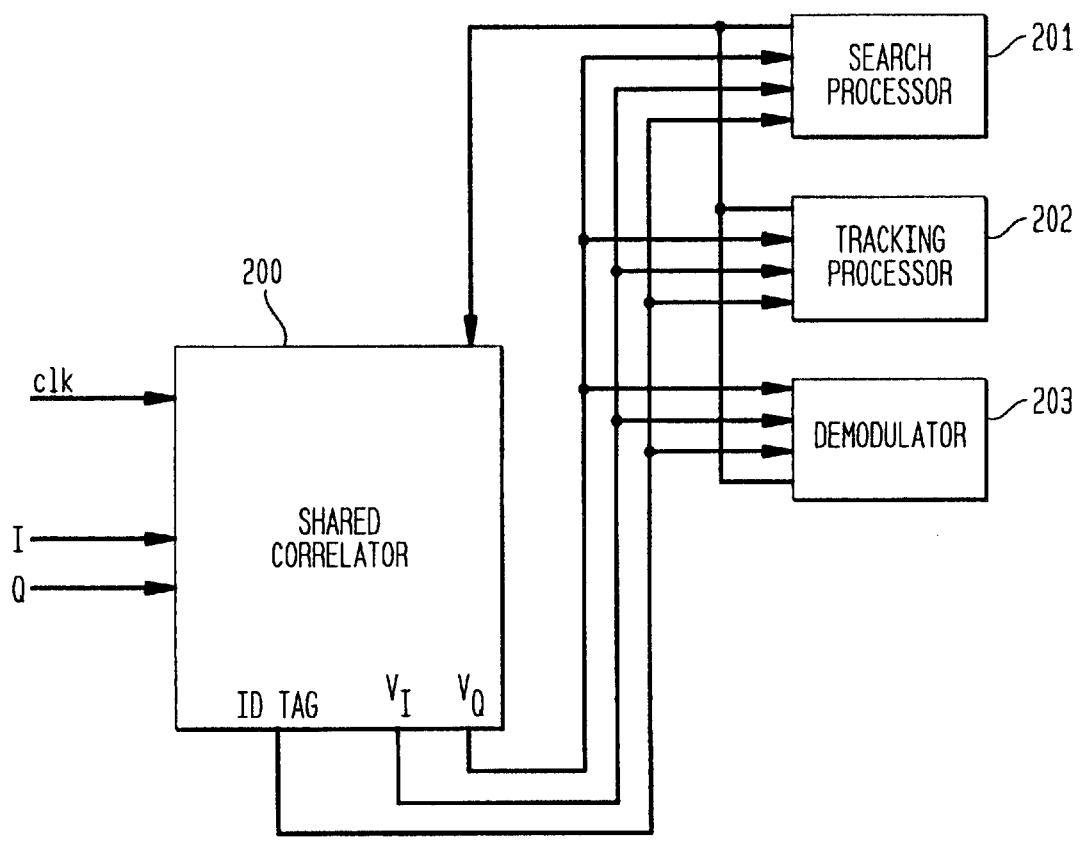
FIG. 2 shows an exemplary shared correlator in accordance with the present invention providing shared correlation operations for processing units of a CDMA receiver.

FIG. 2 shows an exemplary shared correlator 200 providing correlation operations for a search processor 201, tracking processor 202, and demodulator 203 of the CDMA receiver. Search processor 201, tracking processor 202, and demodulator 203 of the CDMA receiver may be processing units providing different functions of the CDMA receiver, and other types of processing units may similarly employ the shared correlator of the present invention. Each of the exemplary search processor 201, tracking processor 202, and demodulator 203 of the CDMA receiver are coupled to the shared correlator 200 by, for example, a shared bus. Each may request correlation operations and receive correlation results (i.e., $v_I$ and $v_Q$ of I and Q sample vectors $I_{REC}$ and $Q_{REC}$, respectively) through the shared bus.

The search processor 201 may be employed to search a received signal for a pilot code sequence of a base station. For this search, the shared correlator may repeatedly generate matched-filter PN vectors with offsets following a search technique, such as linear search (increasing or decreasing number of chips from a reference) or zig-zag search (alternatively increasing and decreasing the number of chips from a reference). For this search, offsets may typically be on the order of a single-chip width. Tracking processor 202 may be employed once synchronization with an embedded code sequence occurs. Tracking processor 202 may correlate several matched-filter PN vectors having relatively small code-phase offsets to identify and maintain correct synchronization with several strong multipath component signals. For this operation, matched-filter PN vectors having a small offset, on the order of a quarter-chip width, are generated and the code-phase offsets associated with the highest SNR (highest correlation) are used for despreading and combining of the received signal. Demodulator 203 may employ matched-filter PN vectors combined with user-channel vectors (i.e., Walsh code or long PN code vectors) for despreading of user channels to recover user or system data channels.

The shared correlator 200 employs pipeline processing techniques to facilitate sharing of correlation functions and results. The various operations to provide correlation results $V_I$ and $V_Q$ are identified by an associated identification (ID) value of a corresponding ID-tag. A vector generator of the shared correlator 200 may generate and accumulate multiple-chip matched PN and sample vector pairs, and launch cross-correlation calculations for the pairs in parallel. Using a scheduler in accordance with the present invention, pipeline processing of the shared correlator may employ a single vector correlator circuit to accommodate the cross-correlation calculations in parallel. As shown in FIG. 2, each of the search processor 201, tracking processor 202, and demodulator 203 sharing the single data bus also receives ID-tags associated with correlation results from the shared bus.

Pipeline processing is a technique known in the art of digital signal processing to enhance the bandwidth of shared execution units. Pipeline processing allows several hardware elements, or stages, to independently process portions of a computational task. Several processing units sharing the hardware elements may each have a computational task divided into parts corresponding to the hardware elements. Under separate control, the portions of the several computational tasks are scheduled for serial execution by each corresponding hardware element. By dividing the computational tasks for independent execution, the several processing units may have their computational tasks performed in parallel, while maintaining serial execution by each hardware element. This technique may be particularly effective when individual pipeline stages are independent of results being calculated in other stages, which condition frequently occurs in microprocessors operating as mathematical execution units.

To facilitate scheduling correlation operations of, and distribution of results to, processing units in communication with a shared execution unit, a separate ID-tag, containing identifying information pertinent to the operation is associated with the correlation results. The correlation results and associated ID-tag are distributed through the digital-processing pipeline. Since a search method of a RAKE receiver, for example, may tolerate latency when processing speeds are high, the present invention employs the pipeline processing technique with ID-tags to expand multiplexing bandwidth of a single matched-filter, or other type, of vector correlator.

For a shared correlator 200 of the present invention, several processing units, such as the search processor 201, tracking processor 202, and demodulator 203 of FIG. 2, may each request correlation operations. The shared correlator schedules each of these correlation operations for a vector correlator, or alternatively a small number (i.e., two or three) vector correlators, and may break each correlation operation into several sub-operations (i.e., for multiple offset correlation fingers, or correlation over several data symbols).

The shared correlator creates a list of ID-tags with an ID-tag for each scheduled operation. The shared correlator determines matched-filter PN vectors for each operation, and associates a corresponding ID-tag with both the sample vectors and matched-filter PN vectors. Consequently, each computational step of a vector correlator may be concurrently shared with different correlation operations, and matched-filter PN vectors may be concurrently generated in a vector generator for other correlation operations during these computational steps.

Once the operations of the shared correlator 200 are scheduled and an ID-tag is associated with the sample vectors and matched-filter PN vectors generated by the vector generator, the ID-tag is associated with correlation results of the vector correlator. These matched-filter PN vectors and correlation results may correspond to portions of a cross-correlation of a correlation finger of search processor 201, correlation finger of tracking processor 202, or demodulation by demodulator 202. The ID-tag identifies, for example, PN code sequence and code-phase offset, type of operation (i.e., search, track or demodulate), position within the operation, and logical channel (i.e., pilot channel or data channel). Since vectors may have a length shorter than the length of a PN sequence, the ID-tag may identify which portion of the PN sequence the correlation results correspond to. The ID-tag is launched along with the corresponding matched-filter PN vectors into a vector correlator of the shared correlator 200.

The ID-tag follows each operation on the vectors within pipeline processing stages, and may be used by processing units of the system by decoding a field of an ID-tag to identify valid data on the shared bus for the processing unit. Since each element may receive several correlation results for an operation, the ID-tag allows for storage of results to process each correlation step of portions of a correlation finger in correct order. The ID-tag also allows for several processing units to use the same correlation results, thereby reducing the number of operations of the vector correlator.

Figure 3:
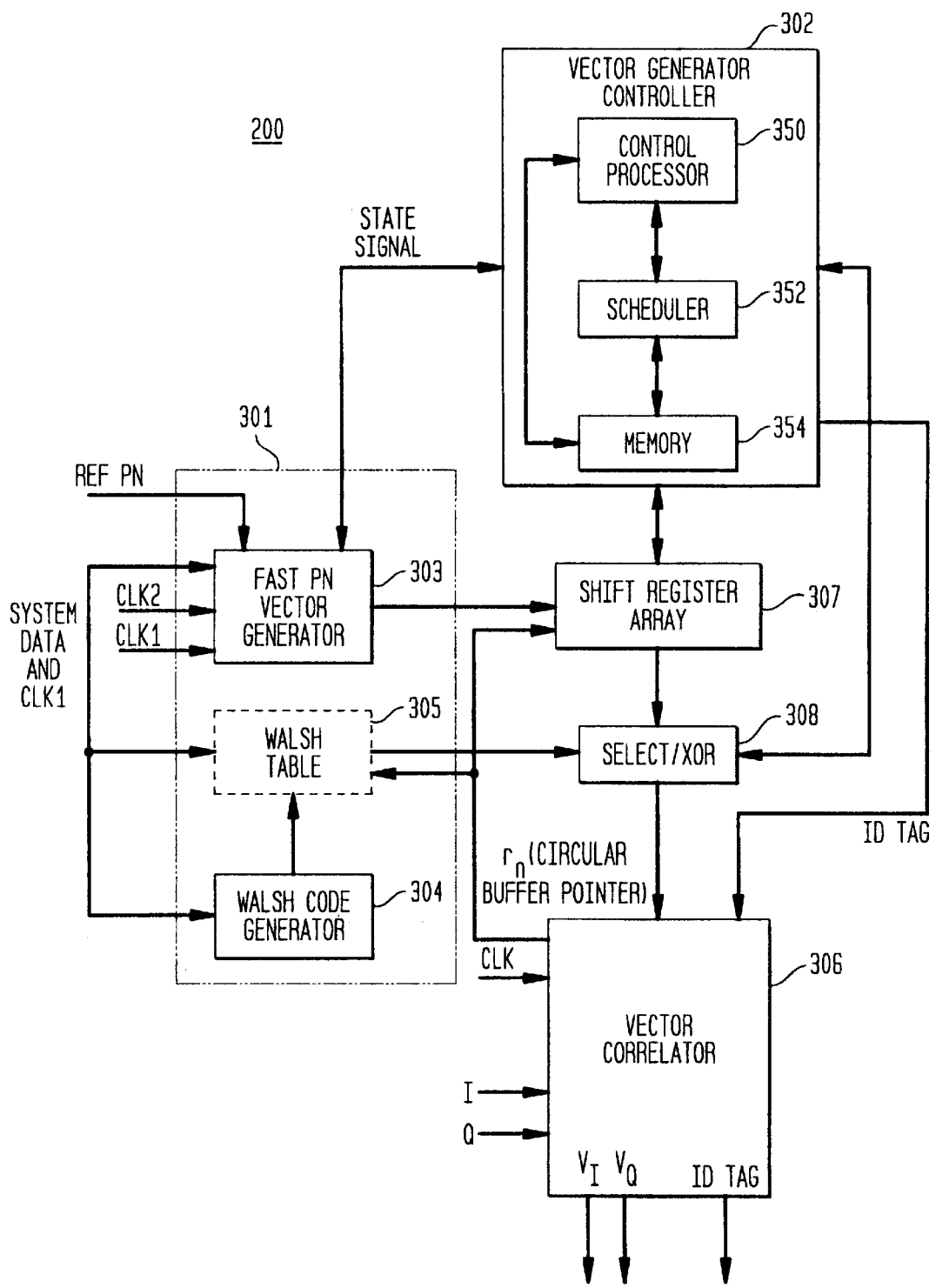
FIG. 3 shows an exemplary embodiment of the shared correlator shown in FIG. 2.

An exemplary embodiment of the shared correlator 200 employing pipeline processing with ID-tags is shown in FIG. 3. The shared correlator 200 includes a vector generator module including vector generator 301 and vector generator controller 302. Vector generator 301 further includes fast PN vector generator 303 and Walsh code generator 304 with optional Walsh code table 305. The shared correlator also includes matched-filter vector correlator 306, shown with shift-register array 307 and select/XOR circuit 308.

The operations of the search processor 201, tracking processor 202 and demodulator 203 of the CDMA receiver are typically controlled by an external controller (not shown), such as a microprocessor. The vector generator controller 302 may be coupled to the external controller to receive requests for different correlation functions related to these operations for pipeline processing. However, the vector generator controller 302 may receive these requests directly from the processing units themselves. Also, the CDMA receiver may generate local reference PN code sequences REF PN and clock signal CLK for use by the vector generator 301 and vector correlator 306 in synchronizing vector code-phase offsets.

Vector generator controller 302 includes a scheduler 352 that schedules correlation operations for vector correlator 306. The vector generator controller 302 generates and maintains a list of ID-tags for each matched-filter PN vector, or set of matched-filter PN vectors, generated by vector generator 301. Vector generator controller 302 also provides various information as a state signal to the fast PN vector generator 303 specifying the particular matched-filter PN vectors to be generated and provided to the vector correlator 306. Vector generator 301 generates the specified vectors, as is described subsequently, and provides the matched-filter PN vectors for storage in shift-register array 307.

When a scheduled correlation operation is desired, the vector generator controller 302 also signals the select/XOR circuit 308 to retrieve one or more desired matched-filter PN vectors from the shift-register array 307. Select/XOR circuit 308 includes selection circuitry to address and retrieve matched-filter PN vectors stored in the shift-register array 307. Select/XOR circuit 308 may include an exclusive-OR operator (XOR) to combine other vectors, such as Walsh code or long PN code vectors, with the matched-filter PN vector, such as may be required when demodulating a user data channel in an IS-95 system. The select/XOR circuit 308, in turn, provides the retrieved matched-filter PN vectors (I-seq and Q-seq) to the vector correlator 306 (FIG. 3) of a CDMA receiver from the shift-register array 304. The shift-register array 304 may also be a large array of, for example, 64-bit wide registers storing many different matched-filter PN vector entries generated by the vector generator 301. In this case, the select/XOR circuit 306 may require address logic to select and retrieve multiple shift-register array entries.

Vector generator controller 302 then provides the ID-tag associated with the retrieved matched-filter vectors to the vector correlator 306. Vector correlator 306 implements the correlation finger as a detection of cross-correlation of the provided matched-filter PN vectors combined with the I and Q sample vectors, $I_{REC}$ and $Q_{REC}$. The correlation results, $V_I$ and $V_Q$, and the associated ID-tag are subsequently provided to the shared bus by vector correlator 306. The vector correlator 306 desirably operates in a serial-multiplexed fashion.

For an exemplary embodiment of the present invention, matched-filter PN vectors may have a vector length of 64 chips (i.e., a 64 chip long sequence vector). This vector length may be, for example, a common vector length for an IS-95 system since a 64-chip period equals the period of a data symbol. Correlation results may desirably be performed on sample vectors $I_{REC}$ and $Q_{REC}$ formed from the received sequences I and Q on a symbol-by-symbol basis for each of the I and Q channels. Consequently, for this embodiment, shift-register array 307 may be a double 64-bit-wide shift register, or an array of shift registers, and the select/XOR circuit 308 may be a multiplexer (MUX). The XOR operator of the select/XOR circuit 308 may be employed, for example, if the matched-filter PN vector is to be combined with a Walsh code vector provided by Walsh code generator 304, or by optional Walsh table 305, such as in IS-95 systems.

Figure 4:
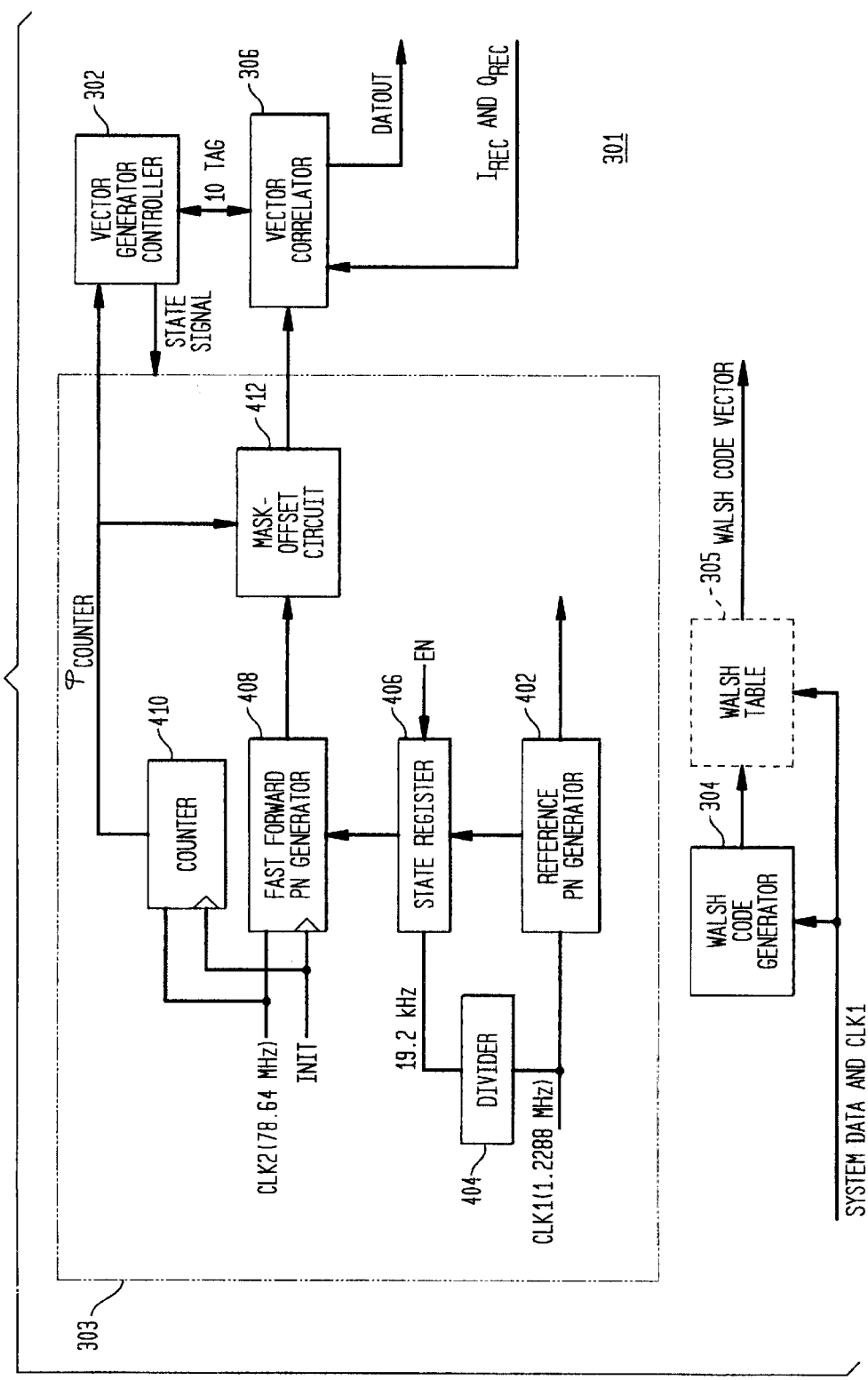
FIG. 4 shows an embodiment of a vector generator of the shared correlator in accordance with the present invention.

The vector generator 301 of FIG. 3 is shown in FIG. 4. The vector generator of the present invention generates the relatively large number of matched-filter PN vectors employed by the vector correlator 306 with code-phase offsets specified by the vector generator controller 302. The PN vector generator 301 allows for high speed generation and multiplexing of multiple matched-filter PN vectors of arbitrary offsets. In addition, the vector generator may allow greater flexibility to generate non-symbol aligned matched-filter PN vectors to exploit correlator capacity in high-speed data and/or handoff situations.

Referring to FIG. 4, there is shown a vector generator 301 in accordance with an embodiment of the present invention. The vector generator controller 302 may have several options, or degrees of freedom, to generate the desired matched-filter PN vector with the vector generator 301. The vector generator 301 includes fast PN vector generator 303, Walsh code generator 304 and optional Walsh table 305. Fast PN vector generator 303 may employ both a set of masks and fast forwarding offset states of a local PN sequence. As shown in FIG. 4, the fast PN vector generator 303 includes a reference PN generator 402, a clock divider 404, a state register 406, a fast forward (FF) PN generator 408, optional counter 410 and mask-offset circuit 412. Reference PN generator 402 may locally generate any one of a number of reference PN sequences employed by the CDMA receiver (i.e., pilot, data or other system spreading codes, if different). The sequences of reference PN generator 402 may be synchronized to a reference PN signal REF PN employed by the CDMA receiver and at a clock rate CLK1.

Walsh code generator 304 may be employed to generate one or more Walsh codes having a given length. Techniques for generation of Walsh codes are well known in the art. However, a Walsh code vector may not necessarily be required. For example, the IS-95 system assigns a different Walsh code for user data, and system data, but assigns no Walsh code (or "zero" Walsh code) to the pilot signal. If the vector generator controller 302 schedules a pilot code search requested by search processor 201, then no Walsh code vectors are necessarily generated. However, if the vector generator controller 302 schedules a demodulation of a user data channel requested by demodulator 203, then the Walsh code generator would generate the specified Walsh code for the user. Further, Walsh code vectors having different code-phase offsets of a reference state Walsh code may be stored in Walsh code table 305. However, the Walsh code generator 304 may directly generate the Walsh code vectors with a specific Walsh code-phase offset without storing the Walsh code vectors in a table.

Figure 1:
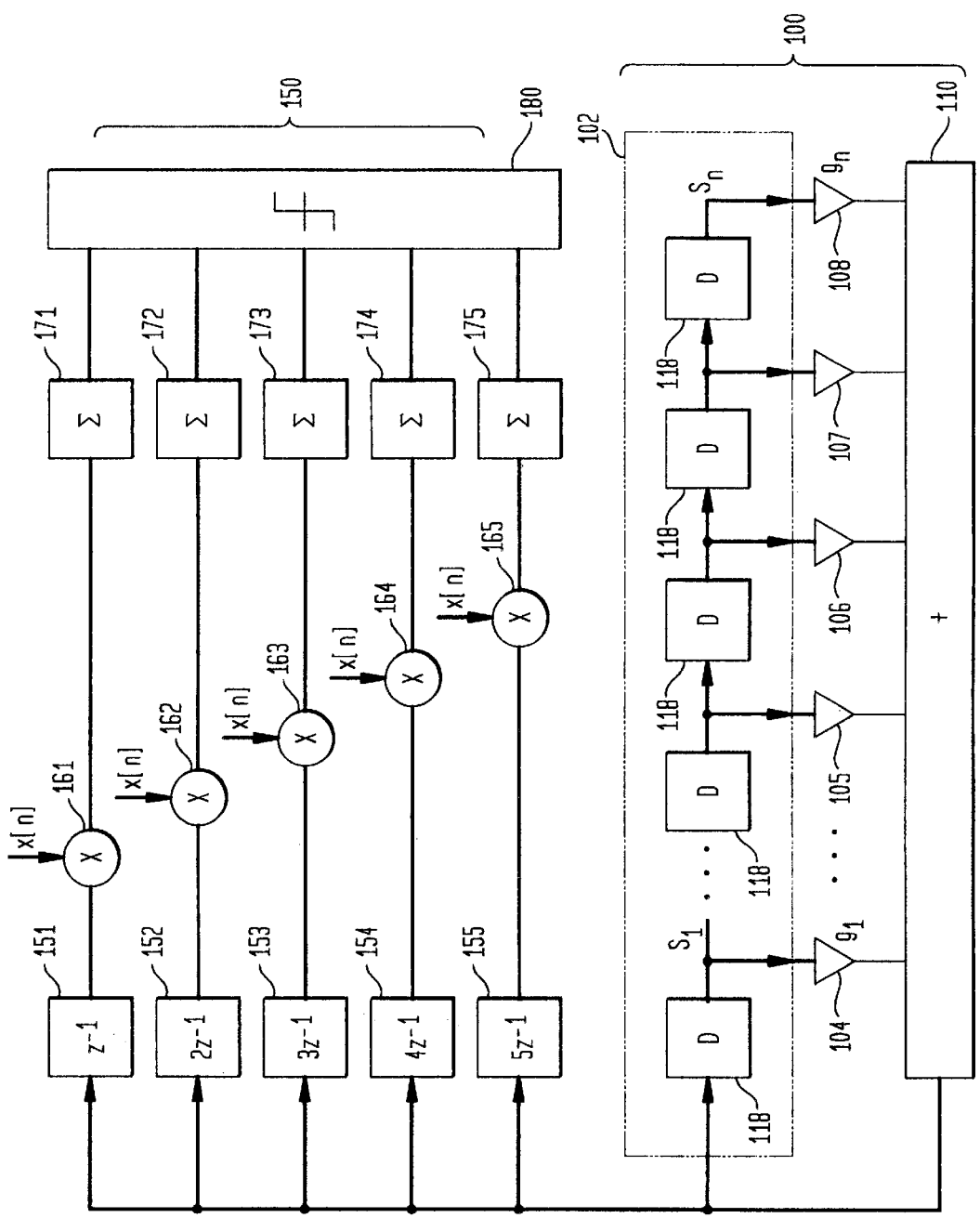
FIG. 1 shows a generalized pseudo-noise generator and a serial correlator of the prior art.

Reference PN generator 402 and FF PN generator 408 each generate PN code sequences as known in the art and may be generated as described with reference to FIG. 1. Although the following describes vector generation with respect to a single reference PN code sequence from reference PN generator 402, the present invention is not so limited. The PN code sequences for the I-channel and Q-channel may be the same PN code sequence with either the same or different code-phase offsets with respect to a reference. For systems such as IS-95, however, the PN code sequences for the I-channel and Q-channel may be different PN code sequences. For example, the reference and FF PN generators 402 and 408, respectively, may be duplicated to generate pairs of offset PN code sequences as matched-filter PN vector pairs for correlation with received values ($I_{REC}$ and $Q_{REC}$) of the I-channel and Q-channel.

State register 406 stores a reference state of the reference PN code sequence generated by the reference PN generator 402. This reference PN code sequence is a free running code with zero code-phase offset, and the reference PN code sequence is clocked at CLK1. The value for CLK1 may be, for example, 1.2288 mega-chips per second (Mcps) as is employed in IS-95 systems, and may be generated from the system clock CLK. The reference state of state register 406 is a particular state value within the local PN sequence that is contained in the shift register of reference PN generator 402. The particular reference state captured may be specified by the vector generator controller 302 and captured by the state register 406 with a clock transition and/or enabling signal EN. The EN signal may be part of the state signal generated by the vector generator controller 302, or may be a clock signal derived from the clock of either the reference PN generator 402 or the data symbol clock. As shown in FIG. 4, the clock signal CLK1 of the reference PN generator 402 may be divided by divider 404 to provide a divided clock signal for the state register 406. Also, a separate EN signal is shown that may enable or disable the capture of successive states on each divided clock transition.

FF PN generator 408 is loaded with the state of state register 406 and generates one or more fast-forward PN sequences. Each fast-forward PN sequence is an offset PN code sequence identical to the reference PN code sequence, or a portion thereof, generated by reference PN generator 402 from the same reference state. However, FF PN generator 408 generates the offset PN code sequence with a clock signal CLK2 that may be of a higher rate than that of the clock signal CLK1 and also derived from CLK.

FF PN generator 408 loads the reference state in accordance with an INIT signal that may be provided in the state signal from the vector generator controller 302. The offset PN code sequence may be the entire reference PN code sequence, but is typically a portion of the reference PN code sequence. The length of the offset PN sequence is determined by the period between successive INIT signals and the clock rate of the FF PN generator 408. The INIT signal may be used to repetitively generate the same sequence from one reference state if the EN signal does not update the value of the state register 406 with a successive reference state. The generation time of each matched-filter PN vector of this case may be 1-chip period in duration. Further, the INIT signal and EN signal may be employed together to generate a periodic sequence of offset PN code sequences by periodically selecting reference states with the EN signal, and generating particular sequences from each reference state with the INIT signal.

Typically, the state register 406 may be updated with either 1) the same reference state or a particular state determined by vector generator controller 302, or 2) successive reference states for each clock period of the data symbol clock. For example, as described previously, the clock signal CLK1 of the reference PN generator 402 at 1.2288 MHz may be divided by the number of chips in a data symbol, for example 64, to provide a divided clock signal of 19.2 KHz for the state register 406. This dividing of CLK1 may be employed such that correlations by the vector correlator 306 occur over a data symbol period. Also, the FF PN generator 408 may provide the offset PN sequence beginning with a specified time-delay with respect to the initial code phase of the reference state in state register 406. The time-delay may be provided by delaying the start of the FF PN generator 408 by either disabling the clock signal or by a separate EN signal. Consequently, this time-delay may not necessarily be aligned with either the clock signal CLK1 of the reference PN generator, divided clock of the PN generator or the symbol clock. Each offset PN code sequence, or a portion thereof, may form a matched-filter PN vector.

As described previously, the FF PN generator 408 may be clocked at a higher frequency than the clock of the reference PN code sequence, which is of 1.2288 MHz for the exemplary IS-95 system. For example, the higher clock signal CLK2 having a rate of 78.864 MHz may clock the offset PN code sequence at 78.864 Mcps. With this higher clock rate, up to 64 offset PN code sequences may provided by the FF PN generator 408 during a period of the reference PN code sequence. The higher clock rate of the FF PN generator 408 combined with the ability to capture each reference state based on the symbol clock allows for generation of multiple offset PN code sequences, each having a different code-phase offset, in advance of the local PN sequence of reference PN generator 402.

The mask-offset circuit 412 combines particular mask values with the offset PN code sequences to provide matched-filter PN vectors that may be used to drive the vector correlator 306. For example, to generate a vector for correlation with an embedded sequence with code-phase offset $\Phi_{off1}$, the mask value to generate the sequence with code-phase offset $\Phi_{off1}$ is combined with a given offset PN code sequence. If a second embedded sequence is present, to generate the sequence for correlation with offset $\Phi_{off2}$ the same reference state is used, but the mask corresponding to offset $\Phi_{off2}$ is applied. This example may correspond to a case where a receiver tracks two different pilot codes of two base stations in an IS-95 system. Each of the embedded sequences may have a known code-phase offset when compared to the first embedded sequence, so a single offset PN code sequence is generated, and each matched-filter PN vector for the two pilot code correlations is generated with respective mask values.

Figure 5:
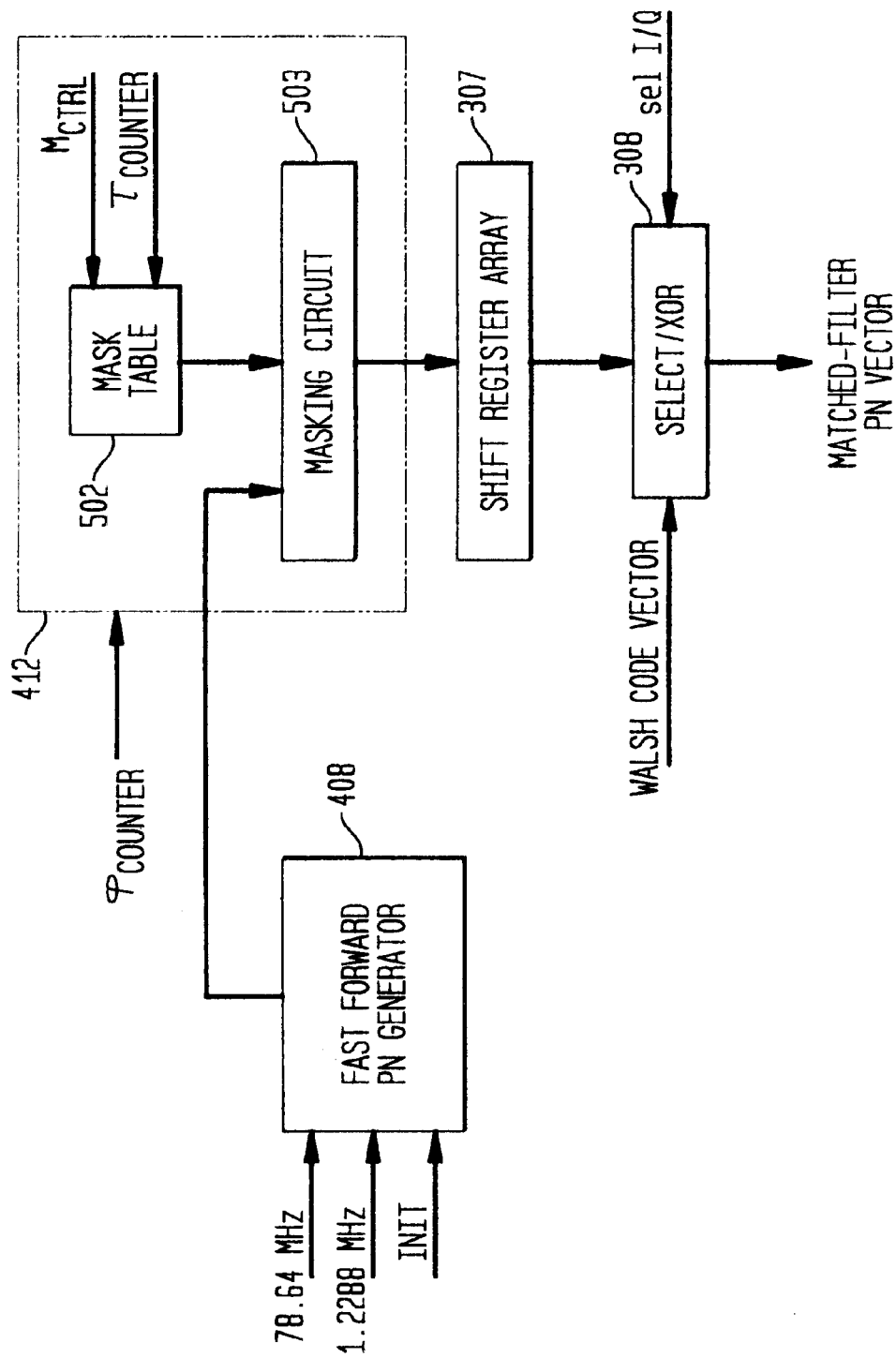
FIG. 5 shows an embodiment of the mask-offset circuit of the vector generator of FIG. 4.

FIG. 5 is a block diagram showing an embodiment of the mask-offset circuit 412. FIG. 5 also shows the FF PN generator 408 operating as described previously to provide multiple versions of the reference PN code sequence to the mask-offset circuit 412. The mask-offset circuit 412 includes mask table 502, and masking circuit 503. Shift-register array 307 and select circuit 308 (FIG. 3) are also shown.

FF PN generator 408 may generate the offset PN code sequences as matched-filter PN vectors (I-seq and Q-seq) for correlation with both sample vectors $I_{REC}$ and $Q_{REC}$. As described previously, the counter 410 may also provide a counter offset value. The mask-offset circuit 412 includes the mask table 502 from which values of masks are selected based on at least one of i) a control signal, MCTRL, from vector generator controller 302, and ii) the counter offset value $\phi_{counter}$. These mask values are then provided to the masking circuit 503, which combines these mask values with the offset PN code sequence to form matched-filter PN vectors. The masking circuit 503 may either receive the entire offset PN code sequence or successive states of the FF PN generator 408. The matched-filter PN vectors of masking circuit 503 are then stored in shift-register array 307.

Figure 6:
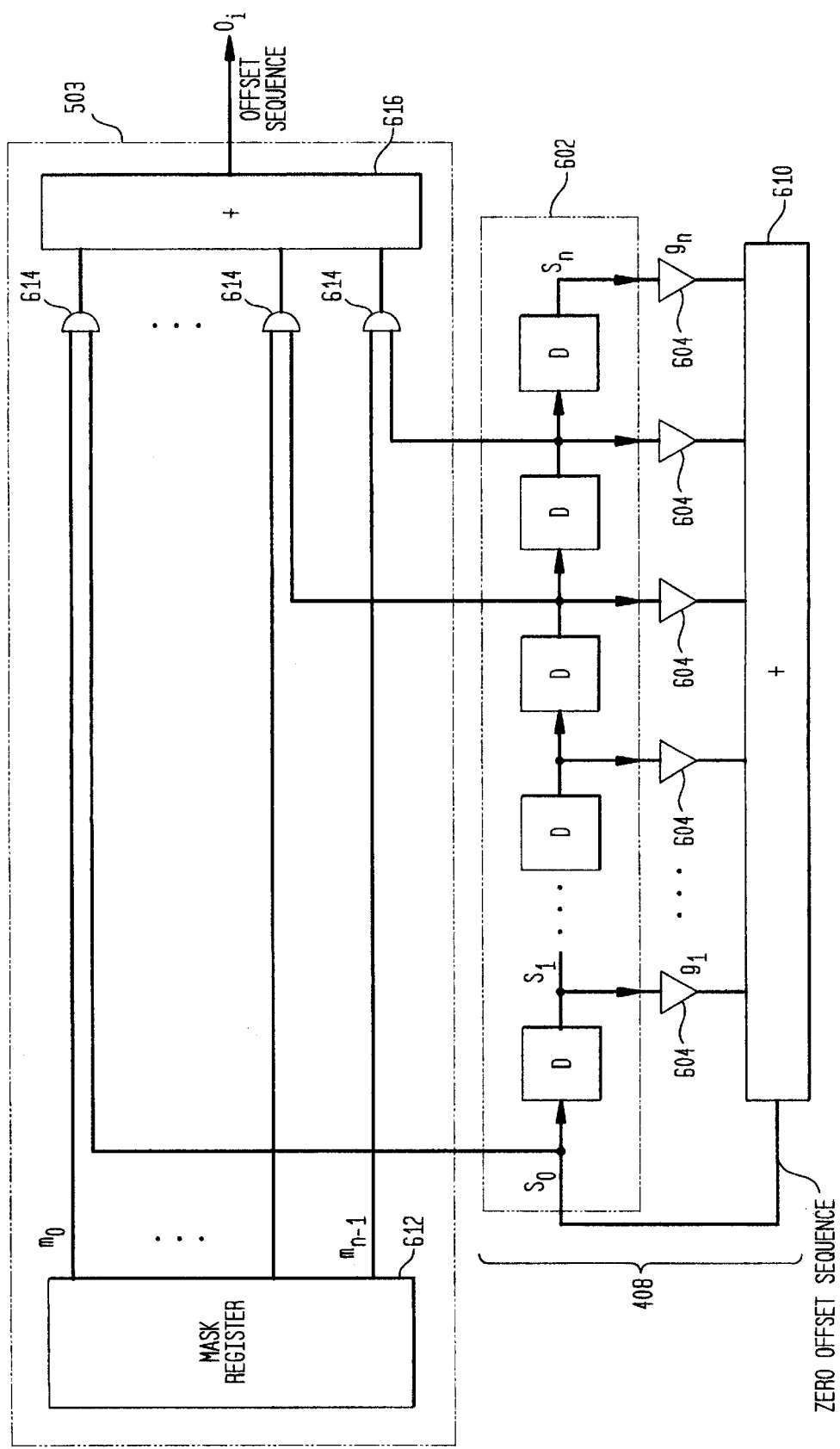
FIG. 6 shows a masking circuit of the mask-offset circuit of FIG. 5.

Referring to FIG. 6, there is shown a masking circuit 503 employed to generate matched-filter vectors from an offset PN code sequence provided from FF PN generator 408. As illustrated, the masking circuit 503 generates matched-filter vectors from successive states of the FF PN generator 408. Also, the FF PN generator 408 as shown in FIG. 6 may include shift register 602 having n stages, n an integer greater than 0, gain amplifiers 604, and modulo-2 adder 610.

The masking circuit 503 includes a mask register 612, which receives mask values M=m$_{[n-1:0]}$ from the mask table 502 (FIG. 5), combiners 514 that may be AND gates, and modulo-2 adder 616. Gain amplifiers 604 have values g$_{[n:0]}$, which are polynomial coefficients of the PN generating polynomial G. Also, the values of the stages in shift register 602 is S=s$_{[n:1]}$, and the mask value in mask register 612 is M=m$_{[n-1:0]}$.

Shift register 602 is loaded with a reference state as described with respect to FIG. 4. Then, for each clock cycle, the values S=s$_{[n:1]}$ of the shift register stages are multiplied by polynomial coefficients g$_{[n:1]}$ via gain amplifiers 604 and combined in modulo-2 adder 610 to provide new value so. This is a cyclic process. The value s$_0$ in modulo-2 adder 610 is then applied to the first element of the shift register 602 and the last element s$_n$ is discarded. For each state of the shift register 602, a chip of a new state may be provided which corresponds to a value of the PN sequence shifted by an offset delay. Combining a state of shift register 102 with a corresponding mask value stored in mask register 612 generates this chip of the new state. The mask values M=m$_{[n-1:0]}$ are combined with the state of shift register 602 by combiners 614. The combined mask and register stage values are then modulo-2 added by adder 616 to provide the chip value o$_i$ of the offset sequence O$_{[n:1]}$.

Some systems, such as IS-95, may insert an extra value in the PN code sequence so that the PN code sequence is a multiple of 2. Additional logic may be required to insert the extra value into each sequence following 14 consecutive 1's or 0's. Additional logic for correcting the masked sequence may also be employed.

One alternative implementation of the mask-offset circuit 412 of FIG. 4 may include a sequence counter and a read-only memory (ROM). The ROM stores the reference PN sequence, and the sequence counter employs the mask value and the current counter value $\phi_{counter}$ to select the point in the stored sequence of the ROM to begin reading values. Another alternative implementation of the mask-offset circuit 412 of FIG. 4 may simply be as a large table of matched-filter vectors stored in, for example, ROM. A reference state of the reference PN generator, a mask value and/or a counter value may then be employed by a memory address-processing module to select a desired matched-filter PN vector from memory. Efficient memory storage structures, such as a trie structure, may be employed to decrease search time of the table.

Returning to FIG. 3, as described previously, vector generator controller 302 provides signals to the fast PN vector generator 303 specifying the particular matched-filter PN vectors to be generated and provided to the vector correlator 306. Since vector generator controller 302 schedules correlation operations for vector correlator 306, the vector generator controller 302 also associates ID-tags received from the scheduler 352 (FIG. 3) for each matched-filter PN vector, or set of matched-filter PN vectors, generated.

Vector generator controller 302 signals the vector generator 301 with vector generation requests by the state signal with multiple degrees of freedom for specific matched-filter PN vectors. The vector generator controller 302 employs these degrees of freedom to schedule and generate matched-filter PN vectors when scheduling correlation operations and associating ID-tags with generated matched-filter PN vectors. For example, some operations may use the same matched-filter PN vectors, one matched-filter PN vector multiple times, completely different matched-filter PN vectors, or a set of matched-filter PN vectors with fixed relative code-phase offsets. The order in which these matched-filter vectors may be generated, or the sequence of correlation operations, may be determined by the relationship between the different required matched-filter PN vectors and/or the sample vectors I$_{REC}$ and Q$_{REC}$.

Vector generator controller 302 includes a control processor 350 that employs an algorithm specifying matched-filter PN vectors with the multiple degrees of freedom defined as follows. Each successive state of reference PN generator 402 is defined with state number $\lambda_L(t)$ having units as number of chips forward (or reverse) of an arbitrary zero code-phase state of the reference PN code sequence (i.e., pilot code rollover, for IS-95). Each state of FF PN generator 408 is defined with state number $\lambda_F$ having units as number of chips forward (or reverse) of the captured reference state of the reference PN code sequence (i.e., local state vector). Each state is defined at a period time, and may change with time in accordance with sequence generation since clock rates of the PN sequence generators may be different. For the mask offset circuit 412, the masked sequence code-phase offset of the mask value is defined as $\Delta_M$ in number of chips. Offsets, which may be defined as the difference between states, are fixed values and may be less than a chip width. Mask offsets, however, are an integer number of chips.

A new state $\lambda_N(t)$ at, for example, t=t$_1$ may be employed to generate a PN sequence as a matched-filter PN vector, and is defined as in equation (3):

$$\lambda_N(t_1)=\lambda_L(t_1)+\lambda_F(t_1)+\Delta_M \qquad (3)$$

The matched-filter PN vector is a sequence that may be a portion of the sequence generated from this new state $\lambda_N(t)$, the portion being of length R chips (i.e., R an integer typically the length of a register). Further, a delay $\tau_{cr}$ may occur between the point in time (t=t$_1$) of generation of the matched-filter PN vector generated for a target state $\lambda_T(t)$ and the point in time t=t$_1$+$\tau_{cr}$ when the matched-filter PN vector is compared to the target vector. This time delay $\lambda_{cr}$ requires an additional offset factor $\Phi_{\tau cr}$ (number of chips of the time delay between reference state capture and comparison time) to be considered. Therefore, the matched-filter PN vector has an offset $\Phi(t=t_1+\tau_{cr})$ as given in equation (4)

$$\Phi(t_1+\tau_{cr})=\lambda_T(t_1+\tau_{cr})-\lambda_N(t_1)-\Phi_{\tau cr} \qquad (4)$$

Combining equation (3) and equation (4), the vector generator 200 provides the matched-filter PN vector from a new state with an offset $\Phi_{VEC}$ related to the target vector state $\lambda_T$ as given in equation (5):

$$\Phi_{VEC}=\lambda_T(t_1+\tau_{cr})-\lambda_L(t_1)-\lambda_F(t_1)-\Delta_M-\Phi_{\tau cr}) \qquad (5)$$

Thus, the vector generator 301 allows for four degrees of freedom to provide the matched-filter PN vector, or offset reference sequence fragment, for comparison with the target vector.

In one exemplary embodiment, in response to signals from vector generator controller 302, the state register 406 (FIG. 4) captures successive reference states of the reference PN code sequence every data symbol period (i.e., a 64-chip period). The clock rate of the FF PN generator 408 is 64 times higher than the clock rate of the reference PN generator 402. The FF PN generator 408 then advances 64 clock periods for each clock cycle of the reference PN code sequence of the reference PN generator 402 to generate an offset PN code sequence of, for example, 64 chips, for each reference state. Then, the divided clock rate of the reference PN generator 402 allows the vector generator 301 to cycle through each of the possible offset reference state numbers. The vector generator 301 captures in state register 406, and loads into the FF PN generator 208, each successive reference state of the shift register of reference PN generator 402 in response to the INIT and EN signals of vector generator controller 302.

For the exemplary embodiment, within the period of the reference PN code sequence at 1.2288 MHz, up to 64 different offset PN code sequences are generated, each with a corresponding code-phase offset from the initial state of the reference PN code sequence. Each code-phase offset may be equivalent to a single chip, multiple chips (based on the delay of enabling the clock of the FF generator 408), or an integer multiple of 64-chips based on capture of successive states. Each offset PN code sequence, or a portion thereof, either forms a matched-filter PN vector, or is used in combination with a mask value to form a matched-filter PN vector. Counter 210 clocked with the 78.864 MHz clock may be employed to give a counter value $\phi_{counter}$ corresponding to the code-phase offset of each offset PN code sequence defined as a matched-filter PN vector. The counter value may also be used by the vector generator controller 302 to select particular mask values to produce offset sequences of the reference PN code sequence.

The counter value may be offset by a predetermined number if, for example, multiple pilot codes are tracked. Since the code-phase offsets between base stations may be known, such as the case with IS-95, the counter may be employed by the vector generator controller 302 as a reference for the currently tracked pilot code and pilot codes of surrounding base stations.

To generate a matched-filter PN vector for correlation with embedded sequence having offset $\Phi_{off1}$ corresponding to time-delay $\tau_{off1}$, a mask value for offset $\Delta_{M1}$ to generate the offset PN code sequence with offset $\Phi_{off1}$ is used. The masked sequence generates a vector aligned with the arriving 64 bits of the embedded sequence, and is launched at time delay $\tau_{cr1}$. To generate the sequence for correlation with offset $\Phi_{off2}$ corresponding to time-delay $\tau_{off2}$, the same reference state $\lambda_L$ is used, but the mask value for offset $\Delta_{M2}$ is applied. The shift register contents are overwritten with the new matched-filter PN vector, which is applied at time delay $\tau_{cr2}$.

Figure 7:
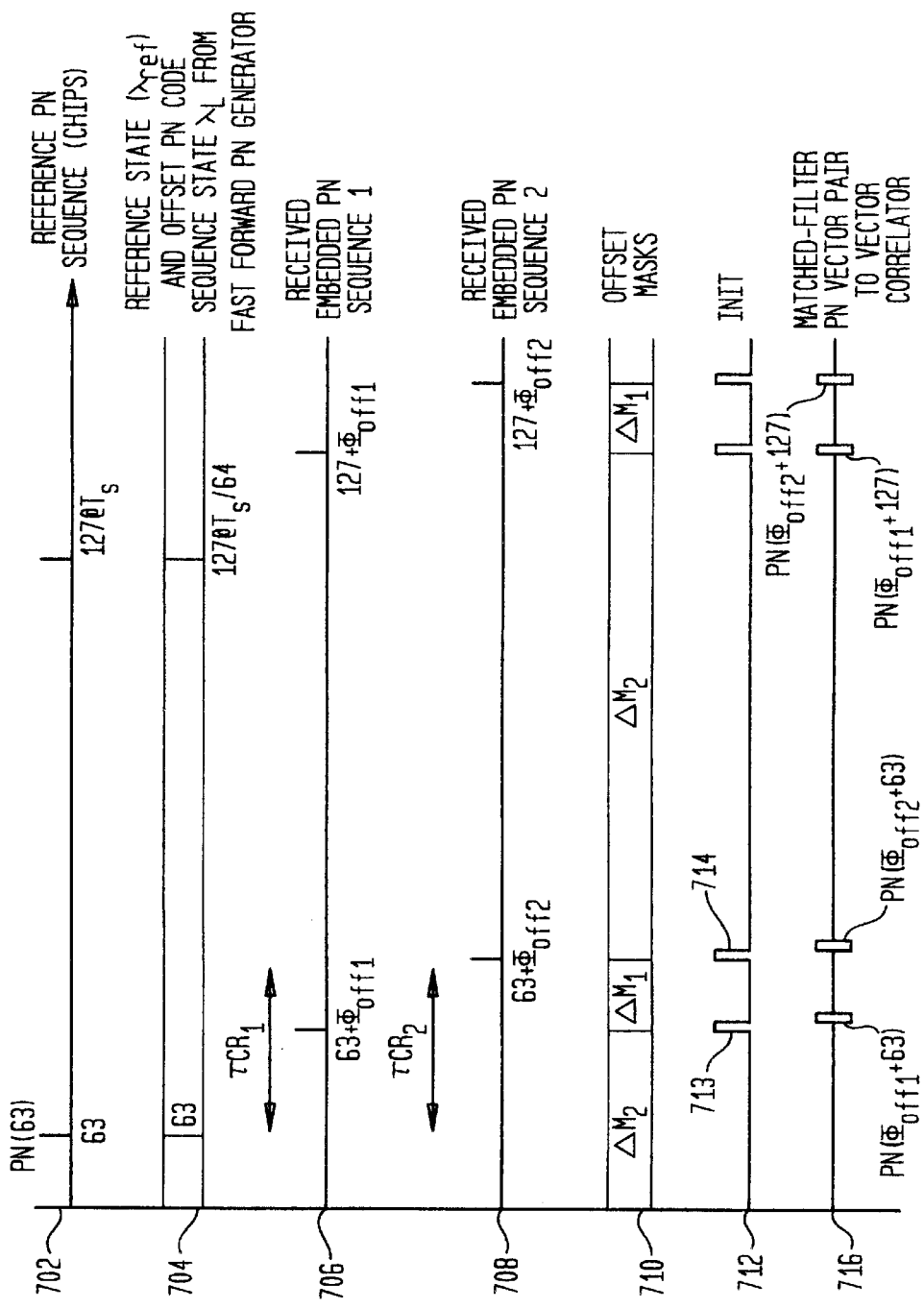
FIG. 7 illustrates a timing diagram of the embodiment of the vector generator.

FIG. 7 illustrates a timing diagram of the vector generator 301 in accordance with the exemplary embodiment of the present invention. As shown on 702 in FIG. 7, during a symbol period $T_S$ the reference PN generator 402 provides chip values corresponding to the reference PN code sequence values 63 through value 127. Consequently, 704 shows that the reference state $\lambda_{REF}$ is stored in the state register 406 and used to generate a offset PN code sequence (e.g., the first 15 values (63 through 77) of the reference PN code sequence are stored assuming a 15-stage, linear-feedback shift register is employed by the reference and FF PN generators 402 and 408, respectively). The chip values corresponding to the reference PN code sequence values 63 through value 127 form the offset PN code sequence, but with period ($T_S/64$). First and second embedded PN sequences are received and are shown on 706 and 708, respectively. As shown the first PN sequence has an offset of $\Phi_{off1}$ and the second embedded PN sequence has a offset of $\Phi_{off2}$ from the chip value 63. Each offset $\Phi_{off1}$ and $\Phi_{off2}$ may correspond to a PN sequence of a different base station.

First and second mask values $\Delta_{M1}$ and $\Delta_{M2}$ are retrieved as shown on 710. The timing for the INIT signal provided to the FF PN generator is shown on 712. Successive transitions of INIT at 713 and 714, respectively, generate two, 64-bit offset sequences equivalent to the offset PN code sequence of 704. As shown in FIG. 7, the retrieval of the first and second mask values $\Delta_{M1}$ and $\Delta_{M2}$ may occur concurrently with generation of the two, 64-bit PN code sequences from state number $\lambda_L$, but such timing may not be necessary. Finally, mask-offset circuit 412 combines the mask values and offset PN code sequences as shown on 716 to form the matched-filter PN vector pair.

FIG. 7 shows the matched-filter vector pair generated nearly synchronized with the embedded PN sequences of 706 and 708 (i.e., launched at time delay $\tau_{cr1}$ and $\tau_{cr2}$), but this may not necessarily occur. However, the vector generator 301 may generate several matched-filter vector pairs as shown in FIG. 7, with each pair launched at a different time delay $\tau_{crn}$. Each time delay $\tau_{crn}$ may result in each pair being separated in code phase by either a chip-width or a fraction of a chip-width. Consequently, the FF PN generator 408 may cycle through all of the possible values of the PN sequence given the known code-phase offsets and various time-delays.

Figure 8:
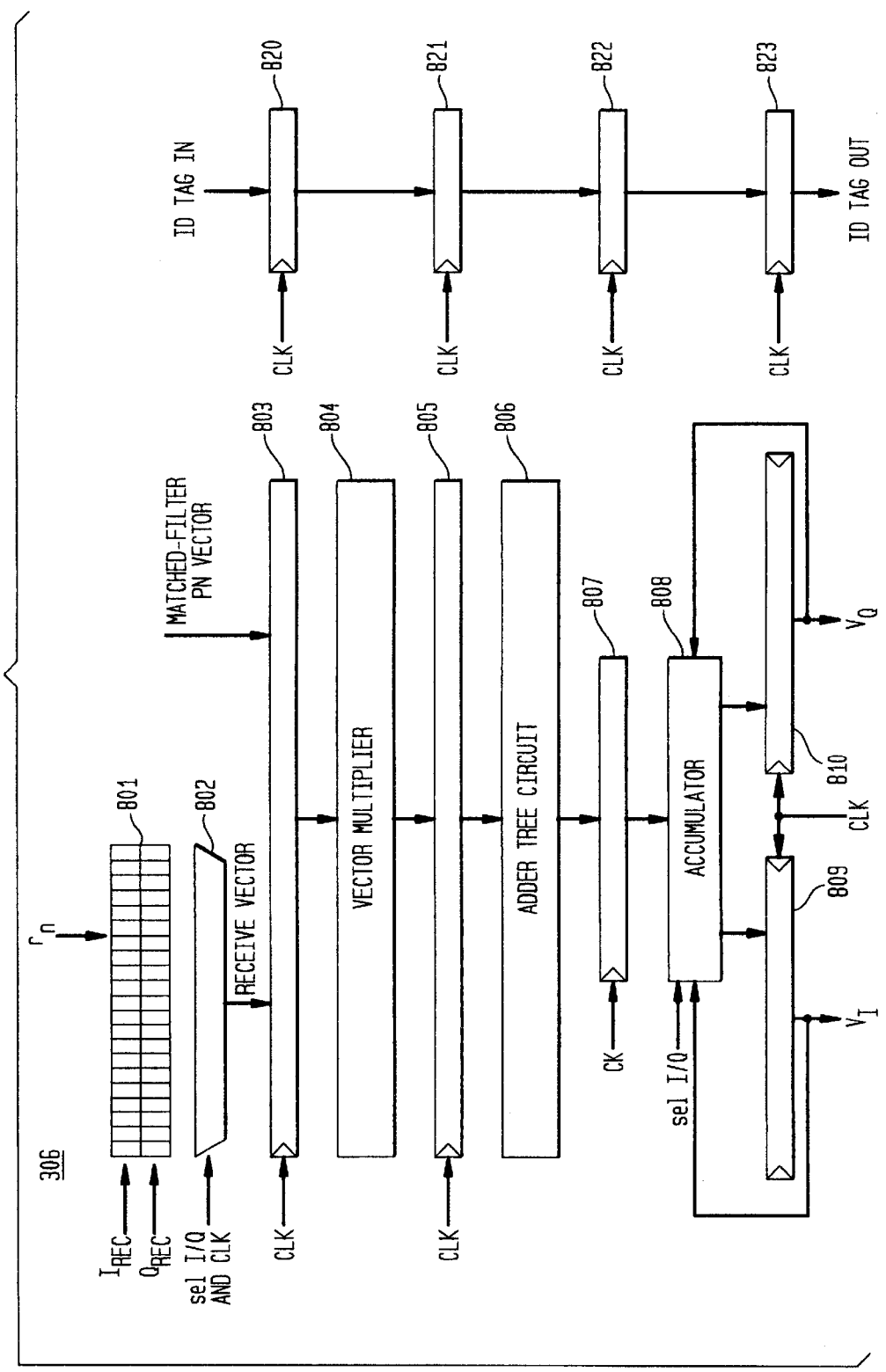
FIG. 8 shows an embodiment of the vector correlator of the shared correlator employing pipeline processing and associated identification tags in accordance with the present invention.

FIG. 8 shows an embodiment of the vector correlator 306 that employs ID-tags and pipeline processing in accordance with the present invention. Vector correlator 306 comprises receive buffer 801, MUX 802, vector register 803, vector multiplier 804, multiplier register 805, adder tree circuit 806 and adder register 807. Vector correlator 306 further includes ID-tag registers 820–823 and accumulate circuit having accumulator 808 and registers 809 and 810 for storing the I and Q correlation results $V_I$ and $V_Q$, respectively. ID-tag registers 820–823 may each be associated with specific clocking of results from operations on vectors by vector register 803, vector multiplier 804 and multiplier register 805, and adder tree circuit 806 and adder register 807, respectively.

Portions of the received sequences I and Q are stored in receiver buffer 801 as sample vectors $I_{REC}$ and $Q_{REC}$. Receiver buffer 801 includes a circular pointer $r_n$. The receive buffer circular pointer rn tracks a beginning of the received sample sequence. In accordance with the Sel I/Q signal, MUX 802 selects one of the current sample vectors $I_{REC}$ or $Q_{REC}$ as an output vector. The Sel I/Q signal may be provided by either an external controller or the vector generator controller 302 to select either an I or Q correlation operation. Upon a first transition of the correlator clock signal CLK, the selected one of the current sample vectors $I_{REC}$ or $Q_{REC}$ from MUX 802 is loaded into the vector register 803. With the same transition of the clock signal CLK, the matched-filter PN vector and corresponding ID-tag are also provided to the vector register 803 and ID-tag register 820, respectively. The matched-filter PN vector may be pre-shifted by the value of the receive buffer circular pointer so as to align the matched-filter PN vector with the current sample vector in a desired manner.

With the next (second) transition of the clock signal CLK, the individual bits of the matched-filter PN vector and current sample vector are bit-multiplied in vector multiplier 804 and stored in multiplier register 805. Concurrently, the ID-tag associated with the matched-filter PN vector and current sample vector is clocked into ID-tag register 821. As would be apparent to one skilled in the art, during the second transition the Sel I/Q signal may change state. The next matched-filter PN vector and next sample vector pair with the associated ID-tag may be loaded into vector register 803 and ID-tag register 820 for the next stage of the pipeline processing.

With the third transition of the clock signal CLK, the bits stored in the multiplier register 805 are added together in adder tree circuit 806 and the result stored in the adder register 307. Also, the third transition causes the ID-tag to be loaded into the corresponding ID-tag register 822. The third transition also causes the next operation (bit-wise multiplication) for the following pair of vectors stored in vector register 803. During the third transition, the Sel I/Q signal may again change state. Also, for the third stage of pipeline processing, the next pair of vectors with associated ID-tag may be loaded into vector register 803 and ID-tag register 820, respectively.

The accumulator circuit may be employed to accumulate correlation results over multiple sample vectors. For the configuration shown in FIG. 8, the correlation results are accumulated for each of the I and Q channels. Based on the Sel I/Q signal and the fourth transition of the clock signal CLK, the result stored in adder register 307 is added by accumulator 808 to the previous accumulated result stored in register 809 or register 810 for the corresponding channel. The result is then stored over the previous accumulated result in register 809 or register 810 as the current correlation result $V_I$ or $V_Q$. The associated ID-tag also clocked into the ID-tag register 823 with the fourth transition. Consequently, correlation result $V_I$ or $V_Q$ and the associated ID-tag are provided to the shared bus (FIG. 2) for use by, for example, the search processor 201, tracking processor 202 or demodulator 203.

For one embodiment of the present invention, the shared correlator employs pipelining to calculate the four real correlations (correlation fingers) of a complex correlation, as given in equation (1) and equation (2). The vector correlator 306 of FIG. 8 performs multiple correlations against successive sample vectors in accordance with the Sel I/Q signal, with MUX 802 selecting one of the current sample vectors $I_{REC}$ or $Q_{REC}$ as an output vector for the real correlation. The Sel I/Q signal may be provided by either an external controller or the vector generator controller 302 to select either an I or Q correlation operation. Each real correlation result is then stored by the accumulator circuit to accumulate the four correlation results as the complex correlation result.

As shown and described, the vector correlator 306 of FIG. 8 performs multiple correlation operations against successive sample vectors. However, the present invention is not so limited to this order. Since pipeline processing is employed, if a different type of scheduled correlation operation is required by vector generator controller 302, the values of the receive buffer 801, vector register 803, multiplier register 805, adder register 807, ID-tag registers 820–823 and accumulate circuit registers 809 and 810 may be stored. Then new or previously calculated values corresponding to correlation operations for another set of receive sample vectors, matched-filter PN vectors, and/or ID-tags may be loaded for the next transition of clock CLK.

For the configuration of FIG. 8, the Walsh code generator 304 (FIG. 3) may provide Walsh code vectors that the vector generator 301 combines with matched-filter PN vectors in the select/XOR circuit 308. The receive buffer circular pointer rn may be aligned with the combined Walsh code and matched-filter PN vector. This alignment may be accomplished by, for example, a programmable barrel shifter receiving the matched-filter PN vector of select circuit 308 of the vector generator 301 and the vector register 803 of the vector correlator 306.

Alternatively, the alignment may be accomplished by aligning the Walsh code vector, the matched-filter PN vector, and the receive buffer circular pointer separately prior to combination. Since the Walsh vectors are fixed code sequences, a simple barrel shift register containing the Walsh code vector aligned to the receive buffer pointer $r_n$ may be employed. For the matched-filter PN vector, one or a combination of the following may be employed: 1) a simple barrel shift register; 2) a first-in, first-out (FIFO) register with write address aligned with $r_n$; and 3) a register which may operate as either a barrel shift register or a FIFO register.

The scheduling operation of the vector generator controller 302 and in accordance with the present invention is now described. The vector generator controller 302 includes a control processor 350 that determines parameters for matched-filter PN vector generation from finger information associated with a correlation operation. The finger information may be provided by the search processor 201, tracking processor 202, and/or demodulator 203. Parameters for matched-filter PN vector generation may be derived by the vector generator controller 302 based on the degrees of freedom described previously. The vector generator controller 302 includes scheduler 352 that schedules, based on signals from the control processor 350, requests for correlation operations by search processor 201, tracking processor 202, and demodulator 203. The control processor 350 generates an ID-tag for each requested correlation operation, and stores the ID-tag as a value in memory 354 for use by the scheduler 352.

An exemplary format for organization of information associated with ID-tags and stored in memory is shown and described with respect to Tables 1–3 and FIG. 9 below. The information of an ID-tag is sufficient to access a set of correlation information stored in a memory 351 to generate matched-filter PN vectors. For example, the set of correlation information for each correlation finger of a RAKE receiver may be stored in memory with a format as shown in Table 1. Each finger is assigned a correlation finger index value, F_INDEX, addressing specific correlation finger information (e.g., code-phase, offset or mask value) stored in memory. A base station association index is assigned having a base station offset (the code-phase offsets for base station identification) and Walsh array index W_ARRAY (the active array of Walsh codes used by the corresponding base station). A format for a base station association index may be as shown in Table 2. Also included in the format of Table 1 is a correlation mode field that lists the particular operations (search, tracking, demodulation, or inactive) that the correlation finger is for.

TABLE 1

| F_INDEX | finger reference (chip offset + sample offset) | base station association index | correlation mode |
|---|---|---|---|
| 0–31 | reference PN code-phase (chip) offset 1 sample offset (15 bits) (2 for 4X OS) | base station association index | search, track, demodulate, or inactive. |

TABLE 2

| base station association index | base station offset | Walsh array index (active Walsh channel array) |
|---|---|---|
| base station association index for finger in Table 2 | 0–512 | (W_ARRAY) |

A request for a correlation operation may be received by the scheduler 352. The correlation operation may be for a correlation finger requested by either the search processor 201, tracking processor 202, or demodulator 203. Steady-state correlation operations of the tracking processor 202 and demodulator 203 occur with a frequency substantially equivalent to the symbol frequency but with a fixed phase offset. For a system following an IS-95 standard, the symbol rate is 19.2 k-symbols per second. A symbol contains 64 chips, resulting in 256 possible phase alignments when 4×oversampling is employed for a sample rate by the receiver. If the complex correlation rate of the RAKE receiver is a multiple of the sample rate, multiple correlations may occur for each sample alignment. For example, a vector correlator 306 operating with a 78MHz clock may correlate at 4× the sample rate, corresponding to 1024 correlations per symbol (with 4×oversampling). Each slot preferably corresponds to a scheduled complex correlation having four real correlation operations.

Consequently, a periodic symbol schedule may be employed to summarize the correlation events during a symbol period. FIG. 9 illustrates a periodic symbol cycle having a period divided into slots as may be employed in accordance with the present invention. For the exemplary IS-95 receiver employing 4×oversampling and correlating at 4× the sample rate, 1024 slots may be allocated in a 52.1 μs cycle (corresponding to the duration of one IS-95 symbol) for correlation operations. This allocation is derived from the exemplary vector correlator 306 with a single vector correlator operating with a 78.MHz clock.

A translation routine of the control processor 350 translates the correlation operation (i.e., finger information) request into information stored in memory having a format such as that shown in Table 3. The request for the correlation operation is assigned a value for the ID-tag (ID-tag value) that is associated with a corresponding slot number. The slot number may be employed as an address in memory for the ID-tag value. The ID-tag value comprises the value for F_INDEX, and may also include a correlation type and Walsh code number. The Walsh code number specifies which Walsh code, or Walsh channel, to combine with the matched-filter PN vector, and the correlation type identifies which processing unit (search processor 201, tracking processor 202, or demodulator 203) will use the associated correlation results. The address value is associated with the ID-tag, and may be used generally as an address pointer for the set of correlation information associated with the correlation finger.

TABLE 3

| Slot | F_INDEX | Walsh code | correlation type |
|------|---------|------------|------------------|
| 0–1023 | 0–31 | 0–63 | search, track, demodulation, or inactive |
| Address | | ID-tag value | |

Figure 9:
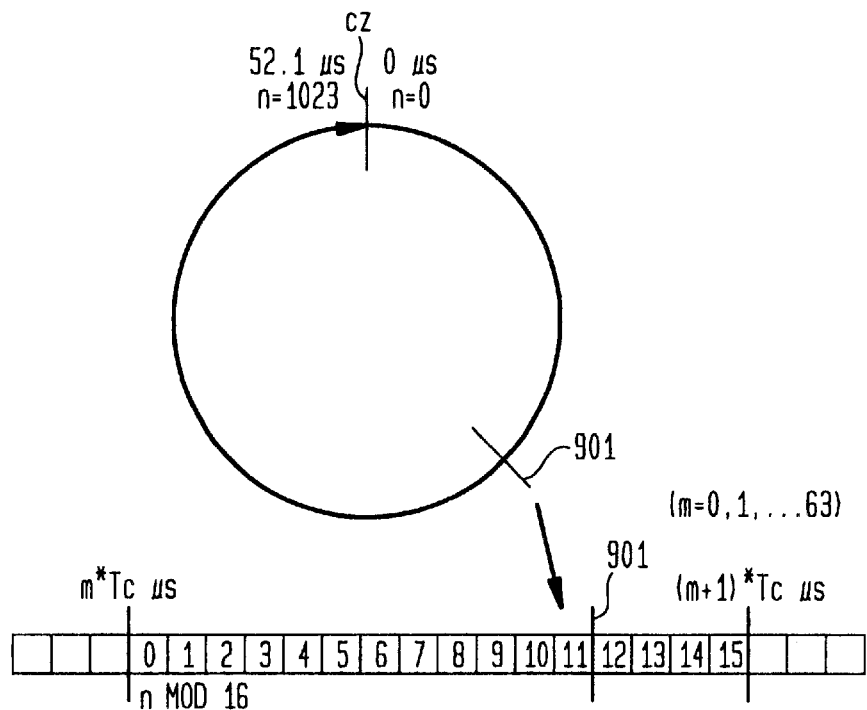
FIG. 9 illustrates a periodic symbol cycle having a period divided into slots as may be employed n accordance with the present invention.

As shown in FIG. 9, the beginning of the cycle may be defined as CZ. The 1024 slots may be allocated among 64 chip periods ($T_c$), allowing 16 correlation operations to be launched per 0.814 μs chip period. In each slot a correlation event may be assigned an ID-tag value as shown in Table 3. The value for the slot of Table 3, therefore, may specify a phase alignment for the periodic correlation operation associated with the ID-tag (and also F_INDEX).

Figure 10:
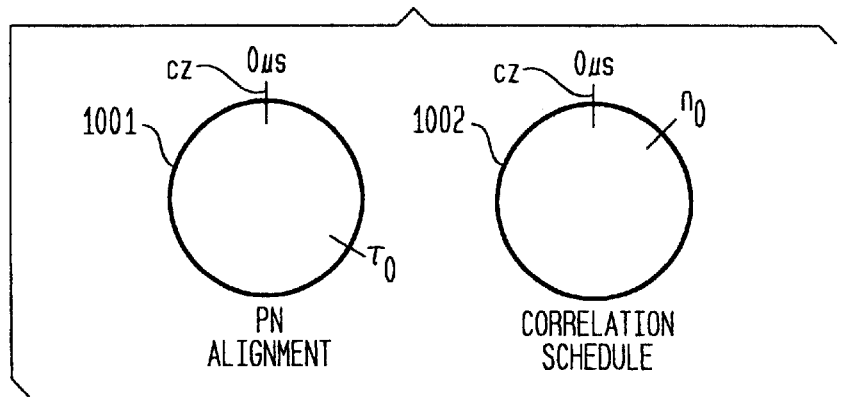
FIG. 10 illustrates first exemplary periodic symbol cycles showing the position of the correlation in a PN code-phase offset space and the schedule for the correlation operation.
Figure 11:
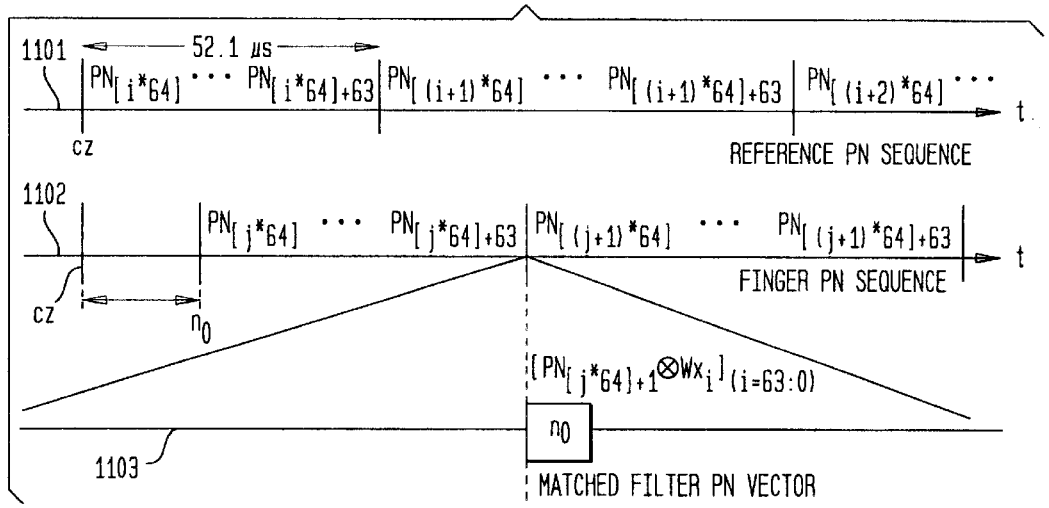
FIG. 11 illustrates code sequence generation for the first exemplary periodic symbol cycles plotted on a time axis for a reference PN code sequence, an offset reference PN code, and a sequence of a matched-filter PN vector.

FIGS. 10 and 11 illustrate an example of scheduling of a correlation operation corresponding to demodulation (e.g., triggered as a request from demodulator 203). The demodulation is for one correlation finger defined for a PN code sequence alignment with time $\tau_0$ corresponding to a code-phase offset $\Phi_{\tau_O}$. The time $\tau_0$ and code-phase offset $\Phi_{\tau_O}$ may be with respect to the local reference PN code sequence from the reference PN generator 402. The demodulation is of a data channel with Walsh code $W_x$. Given correlation finger information, Table 4 is formed by entering this information into the format of Table 1.

TABLE 4

| F_INDEX | finger reference | base station association index | correlation mode |
|---------|------------------|-------------------------------|------------------|
| 0 | $\tau_0$ | 0 | demodulation |

As shown in FIG. 10, the periodic symbol cycle 1001 depicts the position of the correlation in a PN code-phase offset space, and the periodic symbol cycle 1002 shows the schedule for the correlation operation (i.e., schedule assignment for slot $n_o$). For demodulation, the correct code-phase offset of the spreading code of the data channel is known from the search (acquisition) and tracking processes. However, generating a matched-filter PN vector also takes into account the period associated with the length of the vector. Consequently, the time $\tau_0$ may be related to the time of the slot $n_o$ as $n_o$=int[$\tau_0$ mod 52.1*(1024/52.1)]. Table 5 shows the resulting ID-tag information stored in memory based on the format of Table 3.

TABLE 5

| Slot | F_INDEX | Walsh Code | correlation type |
|------|---------|------------|------------------|
| $n_0$ | 0 | $W_x$ | demodulation |
| Address | | ID-tag value | |

FIG. 11 illustrates sequence generation plotted versus time for the reference PN code sequence ($PN_k$), the offset reference PN code sequence (finger PN sequence to produce the matched-filter PN vector), and the sequence of the matched-filter PN vector. Referring to FIG. 11, reference timeline 1101 shows the reference PN code sequence $PN_{[k=0:63]}$ (a sequence of length 64 chips and k an integer indicating the kth chip value in the sequence). The reference PN code sequence may be generated at an arbitrary point with respect to a symbol i, i an integer, so each chip value is defined by the notation $PN_{[i*64]+k}$. Each value for i may represent either a symbol number or base station offset number.

Finger PN sequence timeline 1102 shows the finger PN sequence with respect to the reference PN code sequence $PN_{[i*64]}$+j. The finger PN sequence has a code-phase offset corresponding to the slot $n_0$ with respect to the reference PN code sequence. The finger PN sequence has j repetitions, j an integer, with each chip value defined by the notation $PN_{[j*64]+k}$. The j repetitions may correspond to the number of different correlation operations using the finger PN sequence for a correlation finger of the RAKE receiver.

The vector generator 301 begins to generate the finger PN sequence at slot no, to produce the matched-filter PN vector. Matched-filter vector timeline 1103 shows the sequence of the corresponding matched-filter PN vector $[PN_{[*64]+k} \otimes W_x]_{k=63:0}$ to the vector correlator 306. The matched-filter PN vector is the vector of the finger PN sequence combined with the vector of the Walsh code $W_x$ associated with the ID-tag.

Figure 12:
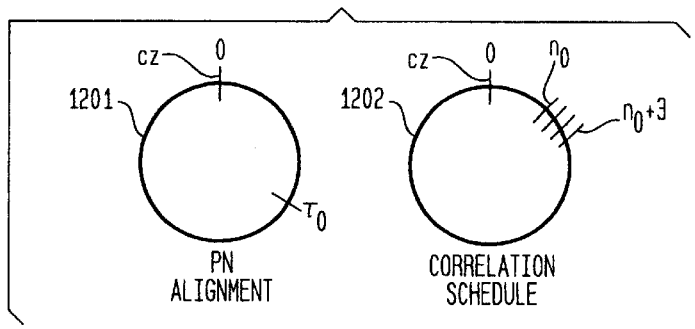
FIG. 12 illustrates second exemplary periodic symbol cycles showing the position of the correlation in a PN code-phase offset space and the schedule for the correlation operation.
Figure 13:
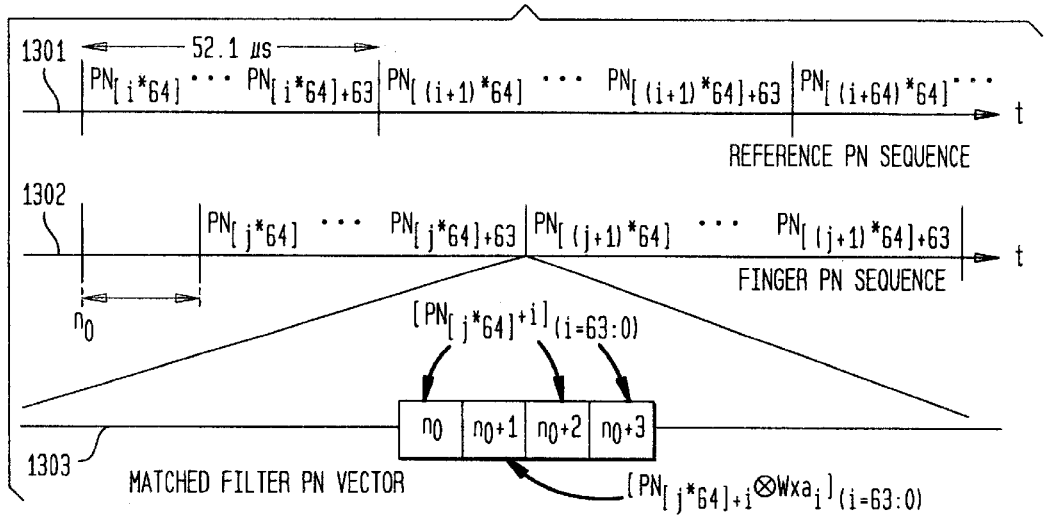
FIG. 13 illustrates code sequence generation for the second exemplary periodic symbol cycles plotted on a time axis for a reference PN code sequence, an offset reference PN code, and a sequence of a matched-filter PN vector.

FIGS. 12 and 13 illustrate an example of scheduling of multiple correlation operations for a correlation finger corresponding to tracking in addition to demodulation (e.g., triggered as a request from both tracking processor 202 and demodulator 203). The time $\tau_0$ and phase offset $\Phi_{\tau_o}$ is with respect to the CZ of the PN code sequence alignment, and the demodulation is of a data channel with Walsh code $W_x$. Given correlation finger information, Table 6 is formed according to the format of Table 1. As shown in FIG. 12, the periodic symbol cycle 1201 depicts the position of the correlation in a PN code-phase offset space, and the periodic symbol cycle 1202 shows the schedule for correlation operations (i.e., schedule assignments for each slot $n_0$, $n_{0+1}$, $n_{0+2}$, and $n_{0+3}$).

TABLE 6

| F_INDEX | finger reference | base station association index | correlation mode |
|---------|------------------|-------------------------------|------------------|
| 0 | $\tau_0$ | 0 | demodulation |

As with the example of FIGS. 10 and 11 for demodulation only, the correct code-phase offset of the spreading code of the data channel (with reference to the reference PN code sequence is known from the search (acquisition) and tracking processes. However, generating only a matched-filter PN vector for demodulation may be inefficient. When the same matched-filter PN vector is generated for multiple slots and one slot is used for demodulation, the other matched-filter PN vectors may be used for tracking (with a quarter-chip code-phase resolution). Table 7 shows the resulting information stored in memory based on the format of Table 3.

While Table 7 is similar to Table 5, slot no is now defined for a correlation for the tracking processor 202 which is a quarter-chip early in code-phase with respect to the correlation finger (finger PN sequence) for demodulation. Slot $n_{0+1}$ is defined for demodulation in a similar manner described with respect to FIGS. 10 and 11. Slot $n_{0+2}$ is defined for a correlation for the tracking processor which has an on-time code-phase (i.e., corresponds in code-phase to the matched-filter PN vector used for demodulation but is not combined with a Walsh code vector $W_x$). Slot $n_{0+3}$ is defined for a correlation for the tracking processor 202 which is a quarter-chip late in code-phase.

TABLE 7

| SLOT | F_INDEX | Walsh Code | correlation type |
|------|---------|------------|------------------|
| $n_0$ | 0 | 0 | track_early |
| $n_{0+1}$ | 0 | $W_x$ | demodulation |
| $n_{0+2}$ | 0 | 0 | track_ontime |
| $n_{0+3}$ | 0 | 0 | track_late |

FIG. 13 illustrates sequence generation versus time for the reference PN code sequence ($PN_k$), the finger PN sequence to produce the matched-filter PN vector, and the sequences of the matched-filter PN vectors. Referring to FIG. 13, reference timeline 1301 shows the reference PN code sequence $PN_{[k=0:63]}$ having a length of 64 chips and the subscript k an integer indicating the kth chip value in the sequence. Finger PN sequence timeline 1302 shows the finger PN sequence with respect to the reference PN code sequence $PN_{[i*64]+j}$. The vector generator 301 begins to generate the finger PN sequence at slot $n_0$, to produce the matched-filter PN vector. Matched-filter vector timeline 1303 shows the sequences of the corresponding matched-filter PN vectors for slots $n_0$, $n_{0+1}$, $n_{0+2}$, and $n_{0+3}$ to the vector correlator 306. As shown in FIG. 13, the same finger PN sequence is used for all four slots.

Correlation operations for search processor 201 generally employ correlating fixed, short code matched-filter PN vectors against several hypothetical code-phase offsets. The correlation operation of the search processor 201, therefore, may be continuous, rather than periodic with respect to a symbol (symbol-periodic). Scheduling correlation operations for the search processor 201 may be different than scheduling correlation operations for the tracking processor 202 and demodulator 203, as described above. To share a single matched-filter vector generator and correlator between continuous (search) and symbol-periodic correlation operations (track and demodulation), the scheduler may simply enable all unoccupied slots for the search processor 201 (if active). According to this method, correlation fingers of the tracking processor 202 and demodulator 203 receive higher priority over acquiring additional fingers.

Organization of correlation events in a periodic symbol schedule, with correlation operations having associated ID-tags, may be implemented with an addressable memory and a counter. The memory address may correspond to the slot position within the schedule, and the sequence of addresses may be accessed with a counter. The counter may have a period equal to the s period of the periodic symbol cycle. The data contained in each address, or slot, is associated with an ID-tag value. If the addressing of the RAM is driven by a periodic counter, then every location is addressed once per symbol, with the output data being the ID-tag value for the matched-filter vector generator 301 and vector correlator 306. The ID-tag value is used by, for example, the vector generator 301 to retrieve the ID-tag information stored at the address associated with the ID-tag value.

To schedule an event in the periodic symbol cycle, such as handing off a correlation finger to the tracking processor 202, the control processor 350 determines the slot corresponding to the desired symbol alignment, and writes the identifying ID-tag value to the slot address location of the scheduler. A slot-to-finger cross-reference to update a correlation finger slot number in the schedule, or delete it entirely, may be employed.

Figure 14:
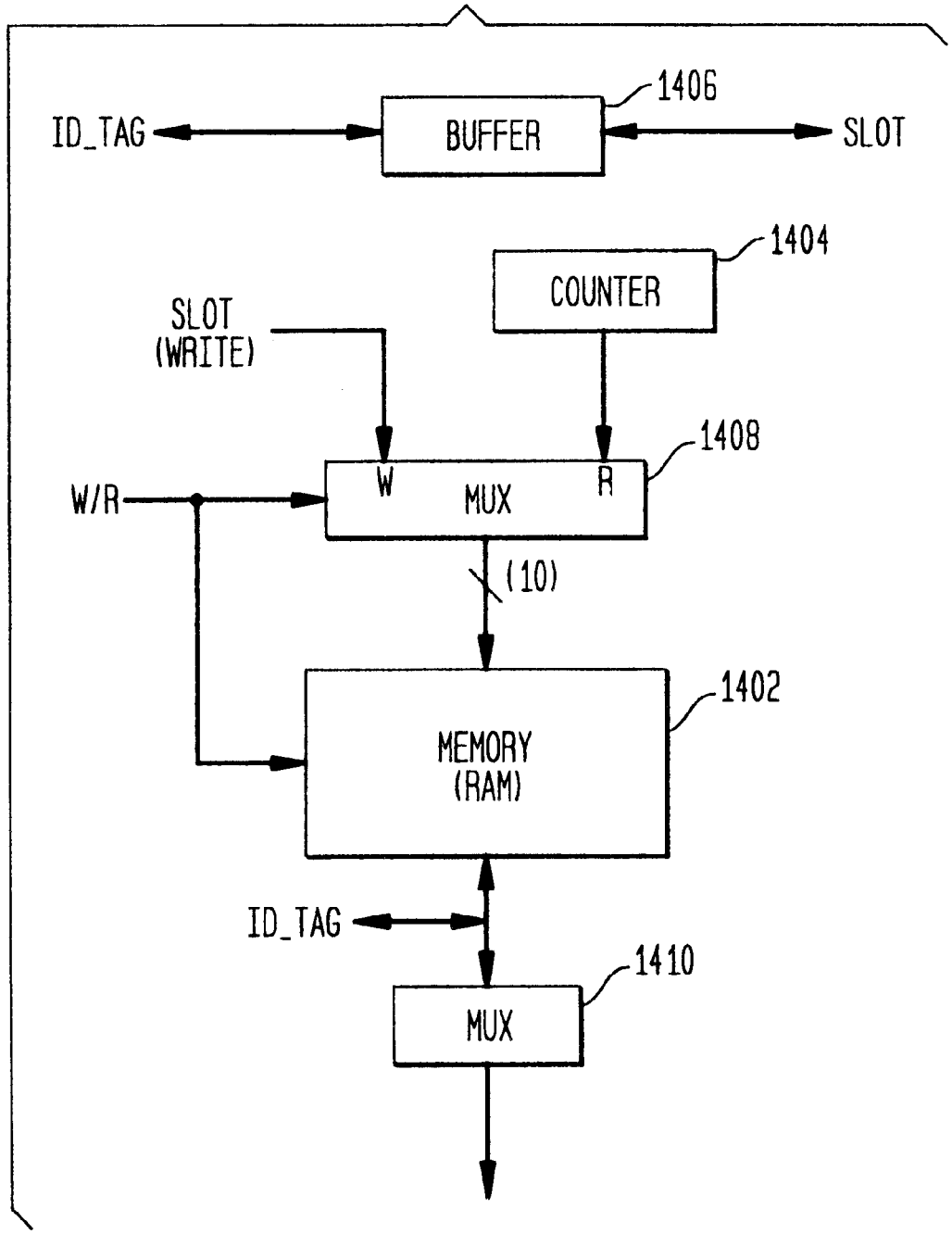
FIG. 14 shows a first exemplary hardware implementation of a scheduler implemented with RAM as an addressable memory for storage of slot information.

FIG. 14 shows a first exemplary hardware implementation of a scheduler 1400 implemented with random access memory (RAM) as an addressable memory for storage of slot information. The scheduler 1400 includes memory 1402, counter 1404, and look-aside buffer 1406. Also shown in FIG. 14 are multiplexers (muxes) 1408 and 1410 which are coupled to the address input and data output ports, respectively, to switch between steady-state and update modes.

The memory 1402 may be implemented as a RAM having a number of addresses at least equal to the number of slots in a symbol period. The memory width of the RAM may accommodate the entire set of ID-tag information. The counter 1404 has a period equal to the duration of the symbol period. In steady state mode the read signal R is enabled, and the counter 1404 supplies, on each count, an address equal to the slot position. The memory 1402 is accessed on each count and the ID-tag value for the slot is accessed, and the ID-tag value and corresponding tag information provided to, for example, the vector generator 301.

In update mode, the write signal W is enabled, and events associated with each of the slots are created, updated, or deleted. Creating an event in the periodic symbol cycle may be, for example, handing off a correlation finger F_INDEX to tracking processor 202. To create an event in the periodic symbol cycle, the vector generator controller 302 determines the slot corresponding to the desired symbol alignment, and writes the ID-tag value to the address location of the slot in the scheduler 1400. To update or delete slots associated with a particular correlation finger, a look-aside table is implemented in software. Given an index of a correlation finger, F_INDEX, a list of slots may be retrieved to access the related ID-tag values. Look-aside buffer 1406 provides slot-to-finger cross reference for finger updates. The look aside buffer 1406 includes a table containing all types of events that may occur during a symbol period. This table may be accessed at a kHz rate, corresponding to time scale for finger updates in a typical IS-95 receiver.

Figure 15:
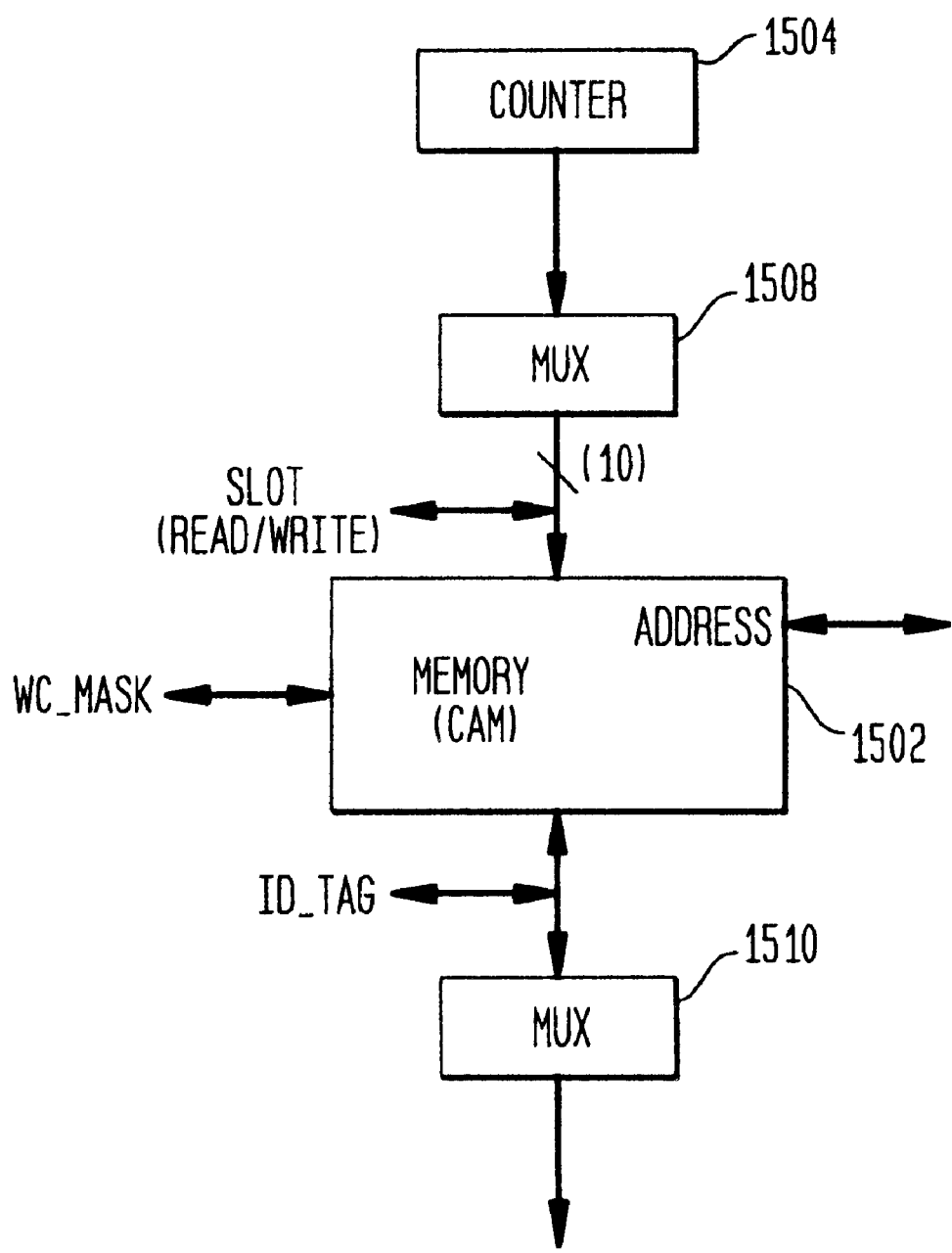
FIG. 15 shows a second exemplary hardware implementation of a scheduler employing a content addressable memory (CAM) as an addressable memory for storage of slot information.

FIG. 15 shows a second exemplary hardware implementation of a scheduler 1500 employing a content addressable memory (CAM) 1502 as an addressable memory for storage of slot information. The scheduler 1500 includes CAM 1502 and counter 1504. Also shown in FIG. 15 are multiplexers (muxes) 1508 and 1510 which are coupled to the address input and data output ports of CAM 1502, respectively, to switch between steady-state and update modes.

Table 8 shows data organization for the CAM of scheduler 1500. To schedule an event in the periodic symbol schedule, the number of the slot is calculated, concatenated with the scheduled ID-tag value, and then stored in the CAM 1502. A CAM device employs a wild card match field WC_MASK for addressing operations to specify which field to match during a search of the memory. Consequently, the memory search may be of either the slot field or ID-tag value field, depending on the operation desired. For steady state mode with read enabled is summarized in Table 9. For steady state mode with read enabled, a symbol-periodic counter applies the current slot count to the CAM 1502, and the CAM 1502 searches the data entries for a matching slot field as specified by the wild card match field. A match by the CAM 1502 causes the CAM 1502 to retrieve the full data field. The ID-tag value is extracted and dispatched to the matched-filter vector generator. The hardware CAM has a number of entries at least equal to the maximum number of symbol-periodic correlation operations as may be anticipated in a particular receiver design. For the second exemplary implementation, the look-aside table may not necessarily be employed, since the memory may be searched according to finger index, F_INDEX.

TABLE 8

| ADDRESS | Slot | finger reference | Walsh code | correlation type |
|---|---|---|---|---|
| CAM ADDRESS | | STORED DATA | | |
| 0–63 | 10 bits | 5 bits | 6 bits | search, track, or inactive (TYPE) (demodulation is implicit from non-zero Walsh coded channel) |

TABLE 9

| | Slot | finger reference | Walsh code | correlation type |
|---|---|---|---|---|
| WC_MASK MATCH INPUT | 0–1023 CURRENT SLOT COUNT | XXXXXX | XXXXXX | XXXXXXXXXXXXXXXXXXXXX |
| OUTPUT | SLOT ENTRY | F_INDEX | $W_x$ | TYPE |

For the second exemplary implementation shown in FIG. 15, the value of the WC_MASK field is provided to the CAM 1502 by the vector generator controller 301. The value of the WC_MASK field specifies which subfield in the data entry to search. In steady state mode, the symbol periodic counter 1504 supplies a counter value as the current slot count, and the CAM 1502 searches memory for a corresponding ID-tag value, enabling the memory search only on the slot field. A valid correlation for the slot will result in a memory search match of the slot field, with the full data field appearing at the data output. The ID-tag value may be extracted from the full data field and passed to the vector generator 301. Finger update is performed by applying the finger index to the data search port, setting the WC_MASK to correspond to the finger index field, F_INDEX, and retrieving the address or addresses. The addresses are then used to access and update the entries of CAM 1502.

To update a correlation finger for tracking, or delete the correlation finger, all entries for that finger are desirably retrieved. To update a finger, the entry information for the CAM 1502 is summarized in Table 10. For the example of Table 10, the W_MASK field is provided corresponding to the correlation finger index, F_INDEX. The CAM 1502 is enabled with WC_MASK so as to search for existing entries with the same F_INDEX value. The corresponding addresses in the CAM 1502 are retrieved, and used to update the corresponding information. For multiple correlation operations, a software routine may be employed to record the output data to prevent the output data from appearing in the next match operation, and to cycle through each entry (representing a correlation operation) for the correlation finger.

TABLE 10

| | Slot | finger reference | Walsh code | correlation type |
|---|---|---|---|---|
| WC_MASK MATCH INPUT | XXXXXXXX | 0–31 F_INDEX | XXXXXXXX | XXXXXXXXXXXXXXXXX |
| OUTPUT 1 | SLOT ENTRY 1 | F_INDEX | $W_x$ #1 | TYPE #1 |
| OUTPUT 2 | SLOT ENTRY 2 | F_INDEX | $W_x$ #2 | TYPE #2 |
| OUTPUT N | SLOT ENTRY N | F_INDEX | $W_x$ #N | TYPE #N |

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention may be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A circuit for scheduling at least one correlation finger request of a shared vector correlator, the circuit comprising:

a control processor adapted to:
   determine parameters for an identification-tag (ID-tag) from finger information of a correlation request, the parameters specifying at least one matched-filter pseudo-noise (PN) vector,
   select, based on the finger information of the correlation request, a slot of a periodic symbol cycle corresponding to a time to generate the matched-filter PN vector, and
   associate the slot with the ID-tag; and a scheduler adapted to provide the ID-tag of each slot of the periodic symbol cycle, wherein the scheduler includes a counter, the value of the counter employed to provide the ID-tag from a memory.

2. The circuit as recited in claim 1, wherein the scheduler comprises:
   a memory, each address of the memory corresponding to a slot and storing the ID-tag associated with the slot; and
   a counter, each value of the counter corresponding to an address of the memory,
   wherein the scheduler sequentially generates each value of the counter to cause the memory to provide the ID-tag stored in the corresponding address.

3. The circuit as recited in claim 2, wherein the memory is a random access memory (RAM).

4. The circuit as recited in claim 3, further comprising a look-aside buffer having a table of slots referenced by at least one finger index and wherein, during an update mode, the control processor is further adapted to 1) store each ID-tag in the table based on each finger index to associate each ID-tag with a slot, 2) disable the counter, and 3) generate a write signal to cause each ID-tag of the table in the look aside buffer to be stored in the address of the RAM corresponding to the associated slot.

5. The circuit as recited in claim 2, wherein the memory is a content address memory (CAM).

6. The circuit as recited in claim 5, wherein:
   the scheduler generates a wild card mask signal based on the slot to cause the CAM to provide the ID-tag stored in the corresponding address, and
   during an update mode, the control processor is further adapted to 11) disable the counter, and 2) generate a wild card mask signal based on the finger information to cause each ID-tag to be stored in the corresponding address of the CAM.

7. A method of scheduling at least one correlation finger request of a shared vector correlator comprising the steps of:
   a) determining parameters defining an ID-tag for at least one matched-filter PN vector from finger information of a correlation request;
   b) selecting, based on the finger information of the correlation request, a slot of a periodic symbol cycle corresponding to a time to generate the matched-filter PN vector;
   c) associating the slot with the ID-tag; and d) sequentially providing the ID-tag of each slot from a memory in accordance with the periodic symbol cycle and based on the value of a counter.

8. The method as recited in claim 7, wherein:

step c) further comprises the step c1) of storing the ID-tag associated with the slot in an address of the memory; and step d) further comprises the step of d1) sequentially providing each value of the counter, each value of the counter corresponding to an address of the memory, and d2) providing, by the memory, the ID-tag stored in the corresponding address of the provided value of the counter.

9. The method as recited in claim 8, wherein, for step c), the memory is a random access memory (RAM).

10. The method as recited in claim 9, further comprising the step of c2) a look-aside buffer having a table of slots referenced by at least one finger index and wherein, during an update mode, step c) further comprises the steps of:

c2) storing, in a table of slots referenced by at least one finger, each ID-tag based on the finger index to associate each ID-tag with a slot;

c3) disabling the counter; and c4) generating a write signal to cause each ID-tag of the table in the look aside buffer to be stored in the address of the RAM corresponding to the associated slot.

11. The method as recited in claim 8, wherein, for step c), the memory is a content address memory (CAM).

12. The method as recited in claim 11, wherein step c) further comprises the steps of:

c2) generating a wild card mask signal based on the slot to cause the CAM to provide the ID-tag stored in the corresponding address, and during an update mode:

c3) disabling the counter, and c4) generating a wild card mask signal based on the finger information to cause each ID-tag to be stored in the corresponding address of the CAM.

13. A receiver having a circuit for scheduling at least one correlation finger request of a shared vector correlator, the circuit comprising:

a control processor adapted to:
determine parameters for an ID-tag from finger information of a correlation request, the parameters specifying at least one matched-filter PN vector,
select, based on the finger information of the correlation request, a slot of a periodic symbol cycle corresponding to a time to generate the matched-filter PN vector, and
associate the slot with the ID-tag; and a scheduler adapted to sequentially provide the ID-tag of each slot of the periodic symbol cycle, wherein the scheduler includes a counter, the value of the counter employed to provide the ID-tag from a memory.

14. The receiver as recited in claim 13, wherein the receiver operates in accordance with an IS-95 standard.

15. The receiver as recited in claim 13, wherein the receiver is a code-division, multiple-access (CDMA) wireless transceiver.

16. The receiver as recited in claim 13, wherein the scheduler comprises:

a memory, each address of the memory corresponding to a slot and storing the ID-tag associated with the slot; and a counter, each value of the counter corresponding to an address of the memory, wherein the scheduler sequentially generates each value of the counter to cause the memory provide the ID-tag stored in the corresponding address.

17. A computer-readable medium having stored thereon a plurality of instructions, the plurality of instructions including instructions which, when executed by a processor, cause the processor to implement a method for scheduling at least one correlation finger request of a shared vector correlator, the method comprising the steps of:

a) determining parameters defining an ID-tag for at least one matched-filter PN vector from finger information of a correlation request;

b) selecting, based on the finger information of the correlation request, a slot of a periodic symbol cycle corresponding to a time to generate the matched-filter PN vector;

c) associating the slot with the ID-tag; and d) sequentially providing the ID-tag of each slot from a memory in accordance with the periodic symbol cycle and based on the value of a counter.

18. The computer-readable medium as recited in claim 17, wherein:

step c) further comprises the step of storing the ID-tag associated with the slot in an address of the memory; and step d) further comprises the step of d1) sequentially providing each value of the counter, each value of the counter corresponding to an address of the memory, and d2) providing, by the memory, the ID-tag stored in the corresponding address of the provided value.

19. An integrated circuit having a circuit for scheduling at least one correlation finger request of a shared vector correlator, the circuit comprising:

a control processor adapted to:
determine parameters for an ID-tag from finger information of a correlation request, the parameters specifying at least one matched-filter PN vector,
select, based on the finger information of the correlation request, a slot of a periodic symbol cycle corresponding to a time to generate the matched-filter PN vector, and
associate the slot with the ID-tag; and a scheduler adapted to sequentially provide the ID-tag of each slot of the periodic symbol cycle, wherein the scheduler includes a counter, the value of the counter employed to provide the ID-tag from a memory.

20. The integrated circuit as recited in claim 19, wherein:

each address of the memory corresponds to a slot and stores the ID-tag associated with the slot; and each value of the counter corresponds to an address of the memory, wherein the scheduler sequentially generates each value of the counter to cause the memory provide the ID-tag stored in the corresponding address.

* * * * *